(12) United States Patent
Wei et al.

(10) Patent No.: US 10,057,779 B2
(45) Date of Patent: Aug. 21, 2018

(54) TECHNIQUES FOR ENHANCING FRAME STRUCTURE AND LISTEN BEFORE TALK PROCEDURE (LBT) FOR TRANSMISSIONS USING AN UNLICENSED RADIO FREQUENCY SPECTRUM BAND

(71) Applicant: QUALCOMM Incorporated, San Diego, CA (US)

(72) Inventors: Yongbin Wei, La Jolla, CA (US); Durga Prasad Malladi, San Diego, CA (US); Aleksandar Damnjanovic, Del Mar, CA (US); Naga Bhushan, San Diego, CA (US); Wanshi Chen, San Diego, CA (US); Tao Luo, San Diego, CA (US); Peter Gaal, San Diego, CA (US); Ravi Teja Sukhavasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/660,717

(22) Filed: Mar. 17, 2015

(65) Prior Publication Data
US 2015/0365830 A1 Dec. 17, 2015

Related U.S. Application Data

(60) Provisional application No. 62/012,259, filed on Jun. 13, 2014.

(51) Int. Cl.
| | |
|---|---|
| *H04W 74/08* | (2009.01) |
| *H04W 16/14* | (2009.01) |
| *H04J 3/16* | (2006.01) |
| *H04W 24/10* | (2009.01) |
| *H04W 72/04* | (2009.01) |

(52) U.S. Cl.
CPC .......... *H04W 16/14* (2013.01); *H04J 3/1694* (2013.01); *H04W 24/10* (2013.01); *H04W 72/0453* (2013.01); *H04W 74/0808* (2013.01)

(58) Field of Classification Search
USPC ........................................................ 370/280
See application file for complete search history.

(56) References Cited

U.S. PATENT DOCUMENTS

| | | |
|---|---|---|
| 2011/0128895 A1 | 6/2011 | Sadek et al. |
| 2013/0208587 A1* | 8/2013 | Bala ...................... H04W 16/14 370/230 |

(Continued)

FOREIGN PATENT DOCUMENTS

| | | |
|---|---|---|
| EP | 2696530 A2 | 2/2014 |
| WO | WO-2012139278 A1 | 10/2012 |

OTHER PUBLICATIONS

NPL document "ETSI EN 301.893 V1.7.1", dated Jun. 2012.*

(Continued)

*Primary Examiner* — Gregory Sefcheck
*Assistant Examiner* — Majid Esmaeilian
(74) *Attorney, Agent, or Firm* — Dalei Dong; Holland & Hart

(57) ABSTRACT

Techniques are described for wireless communication. A method for wireless communication includes identifying a frame structure for transmissions using an unlicensed radio frequency spectrum band, the frame structure including at least two special subframes; and performing a procedure to gain access to the unlicensed radio frequency spectrum band during at least a portion of at least one of the at least two special subframes.

21 Claims, 14 Drawing Sheets

(56) References Cited

U.S. PATENT DOCUMENTS

| | | | | |
|---|---|---|---|---|
| 2015/0063233 A1* | 3/2015 | Choi | ............ | H04W 52/0216 |
| | | | | 370/329 |
| 2015/0195849 A1* | 7/2015 | Bashar | ............ | H04W 16/14 |
| | | | | 370/330 |
| 2015/0312910 A1* | 10/2015 | Damodaran | ............ | H04W 28/20 |
| | | | | 370/329 |
| 2016/0205615 A1* | 7/2016 | Seok | ............ | H04W 48/16 |
| | | | | 370/338 |
| 2016/0302230 A1* | 10/2016 | Novlan | ............ | H04B 17/318 |

OTHER PUBLICATIONS

IPEA/EPO, Second Written Opinion of the International Preliminary Examining Authority, Int'l Appl. No. PCT/US2015/029611, May 23, 2016, European Patent Office, Rijswijk, NL, 5 pgs.

Alcatel-Lucent et al., "Review of Regulatory Requirements for Unlicensed Spectrum," Jun. 13, 2014, 12 pgs., RWS-140015, Shanghai, URL: ttp://www.3gpp.org/ftp/Meetings_3GPP_SYNC/2014-06-13_LTE-U/Docs/, 3rd Generation Partnership Project.

Beluri et al., "Mechanisms for LTE Coexistence in TV White Space," 2012 IEEE International Symposium on Dynamic Spectrum Access Networks (DYSPAN), Bellevue, WA, Oct. 16-19, 2012, pp. 317-326, Institute of Electrical and Electronics Engineers.

ISA/EPO, International Search Report and Written Opinion of the International Searching Authority, Int'l Appl. No. PCT/US2015/029611, Jul. 13, 2015, European Patent Office, Rijswijk, NL, 10 pgs.

* cited by examiner

TECHNIQUES FOR ENHANCING FRAME STRUCTURE AND LISTEN BEFORE TALK PROCEDURE (LBT) FOR TRANSMISSIONS USING AN UNLICENSED RADIO FREQUENCY SPECTRUM BAND

CROSS REFERENCES

The present Application for Patent claims priority to U.S. Provisional Patent Application No. 62/012,259 by Wei et al., entitled "Techniques For Enhancing Frame Structure And Listen Before Talk Procedure (LBT) For Transmissions Using An Unlicensed Radio Frequency Spectrum Band," filed Jun. 13, 2014, assigned to the assignee hereof, and expressly incorporated by reference herein.

BACKGROUND

Field of the Disclosure

The present disclosure, for example, relates to wireless communication systems, and more particularly to techniques for enhancing frame structure and listen before talk procedure (LBT) for transmissions using an unlicensed radio frequency spectrum band.

Description of the Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, implement a Listen Before Talk (LBT) protocol to gain access to the unlicensed radio frequency spectrum band. An LBT protocol may include performing a clear channel assessment (CCA) procedure to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA procedure may be performed for the channel again at a later time.

In some cases, transmissions by one or more nodes over an unlicensed radio frequency spectrum band (e.g., Wi-Fi nodes and/or nodes of other operators) may prevent a base station or UE from gaining access to the unlicensed radio frequency spectrum, resulting in the base station or UE being "starved" of use of the unlicensed radio frequency spectrum band. In some cases, this starvation problem may be mitigated by using an LBT protocol configured for load based equipment (LBT-LBE) instead of an LBT protocol configured for frame based equipment (LBT-FBE). In an LBT-LBE protocol, an extended CCA (eCCA) procedure comprising a plurality of N CCA procedures may be performed. The eCCA procedure performed in conjunction with an LBT-LBE protocol may provide a base station or UE a better chance to gain access to an unlicensed radio frequency spectrum band (e.g., compared to a single CCA procedure performed in conjunction with an LBT-FBE protocol).

SUMMARY

The present disclosure, for example, relates to one or more techniques for enhancing a frame structure and a Listen Before Talk (LBT) procedure for transmissions using an unlicensed radio frequency spectrum band. When a user equipment (UE) and base station communicate over the unlicensed radio frequency spectrum band using a time division duplex (TDD) protocol, the UE and base station may share the same frequency spectrum. This may lead to complications in an extended clear channel assessment (eCCA) procedures of the UE and base station. The techniques disclosed herein identify a TDD frame structure with one or more special subframes that may enable the UE and/or base station to perform the LBT procedure to gain access to the unlicensed radio frequency spectrum band.

In one example, a method for wireless communication is described. In one example, the method may include identifying a frame structure for transmissions using an unlicensed radio frequency spectrum band, the frame structure including at least two special subframes, and performing a procedure to gain access to the unlicensed radio frequency spectrum band during at least a portion of at least one of the at least two special subframes.

In some examples of the method, the frame structure may include a time division duplex (TDD) frame structure. In some examples of the method, at least one of the at least two special subframes may include a silent period. In some examples of the method, the procedure to gain access to the unlicensed radio frequency spectrum band may include a listen before talk procedure. In some examples of the method, performing the listen before talk procedure may include performing an enhanced clear channel assessment (eCCA) procedure. In some examples of the method, the at least two special subframes may include an uplink special subframe and a downlink special subframe. In some examples of the method, at least a portion of the uplink special subframe may be used for the eCCA procedure and at least a portion of the downlink special subframe may be used for the eCCA procedure. In some examples of the method, at least a portion of the uplink special subframe may include a silent period and at least a portion of the downlink special subframe may be used for the eCCA procedure.

In some examples of the method, the frame structure includes at least one special subframe, and the method may include performing a procedure to gain access to the unlicensed radio frequency spectrum band during at least a portion of the at least one special subframe. In some examples of the method, performing the listen before talk procedure may include performing an eCCA procedure. In some examples of the method, at least a portion of the at least one special subframe may be used for the eCCA procedure by both UEs and base stations.

In some examples, the method may include dynamically adjusting the portion of the at least one of the at least two special subframes during which the eCCA procedure is performed. In some examples of the method, dynamically adjusting the portion of the at least one of the at least two special subframes may include identifying a first value associated with a channel occupancy time and identifying a second value based at least in part on the first value, the second value being a counter to indicate a number of successful CCA procedures to perform as part of the eCCA procedure. In some examples of the method, at least one of the at least two special subframes may include a silent period, the duration of the silent period being based at least in part on the second value.

In some examples, the method may include determining a successful CCA procedure, decrementing the second value upon the determination of a successful CCA procedure, and determining whether the second value equals zero. In some examples, the method may include continuing the listen before talk procedure beyond the portion of the at least one of the at least two special subframes if the second value is not equal to zero at the end of the at least one special subframe. In some examples, upon determining that the second value equals zero, the method may further include transmitting an information signal. In some examples, upon determining that the second value equals zero, the method may include performing a simple CCA procedure, and transmitting an information signal. In some examples of the method, the information signal may include a channel usage beacon signal. In some examples of the method, the information signal may include at least one symbol of a channel usage beacon signal.

In some examples, the method may include dynamically adjusting a boundary of the portion of the at least one of the at least two special subframes to transmit the information signal, the adjustment of the boundary being based at least in part on the identified second value. In some examples of the method, identifying the first value associated with the channel occupancy time may include accessing a database comprising a plurality of first values, and selecting one of the plurality of first values from the database. In some examples of the method, identifying the first value associated with the channel occupancy time may include receiving the first value via a unicast or a broadcast transmission.

In some examples, the method may include transmitting the identified first value via a unicast or a broadcast transmission. In some examples of the method, the first value is identified based at least in part on an uplink/downlink (UL/DL) configuration. In some examples of the method, the first value is identified based at least in part on a load of a channel of the unlicensed radio frequency spectrum band. In some examples of the method, the first value is identified based at least in part on a channel access success statistic.

In some examples, the method may include synchronizing the listen before talk procedure with a base station based at least in part on the second value. In some examples of the method, the second value is identified based at least in part on a downlink channel occupancy time. In some examples, the method may include synchronizing the listen before talk procedure with a UE based at least in part on the second value. In some examples of the method, the second value is identified based at least in part on an uplink channel occupancy time.

In one example, an apparatus for wireless communication is described. In one example, the apparatus may include a processor, memory in electronic communication with the processor, and instructions stored in the memory. The instructions may be executable by the processor to identify a frame structure for transmissions using an unlicensed radio frequency spectrum band, the frame structure including at least two special subframes, and perform a procedure to gain access to the unlicensed radio frequency spectrum band during at least a portion of at least one of the at least two special subframes. In some examples, the instructions may also be executable by the processor to implement one or more aspects of the method for wireless communication described above with respect to the first set of illustrative examples.

In one example, another apparatus for wireless communication is described. In one example, the apparatus may include means for identifying a frame structure for transmissions using an unlicensed radio frequency spectrum band, the frame structure including at least two special subframes, and means for performing a procedure to gain access to the unlicensed radio frequency spectrum band during at least a portion of at least one of the at least two special subframes. In some examples, the apparatus may further include means for implementing one or more aspects of the method for wireless communication described above with respect to the first set of illustrative examples.

In one example, a computer program product for communication by a wireless communication apparatus in a wireless communication system is described. In one example, the computer program product may include a non-transitory computer-readable medium storing instructions executable by a processor to cause the wireless communication apparatus to identify a frame structure for transmissions using an unlicensed radio frequency spectrum band, the frame structure including at least two special subframes, and perform a procedure to gain access to the unlicensed radio frequency spectrum band during at least a portion of at least one of the at least two special subframes. In some examples, the instructions may also be executable by the processor to cause the wireless communication apparatus to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
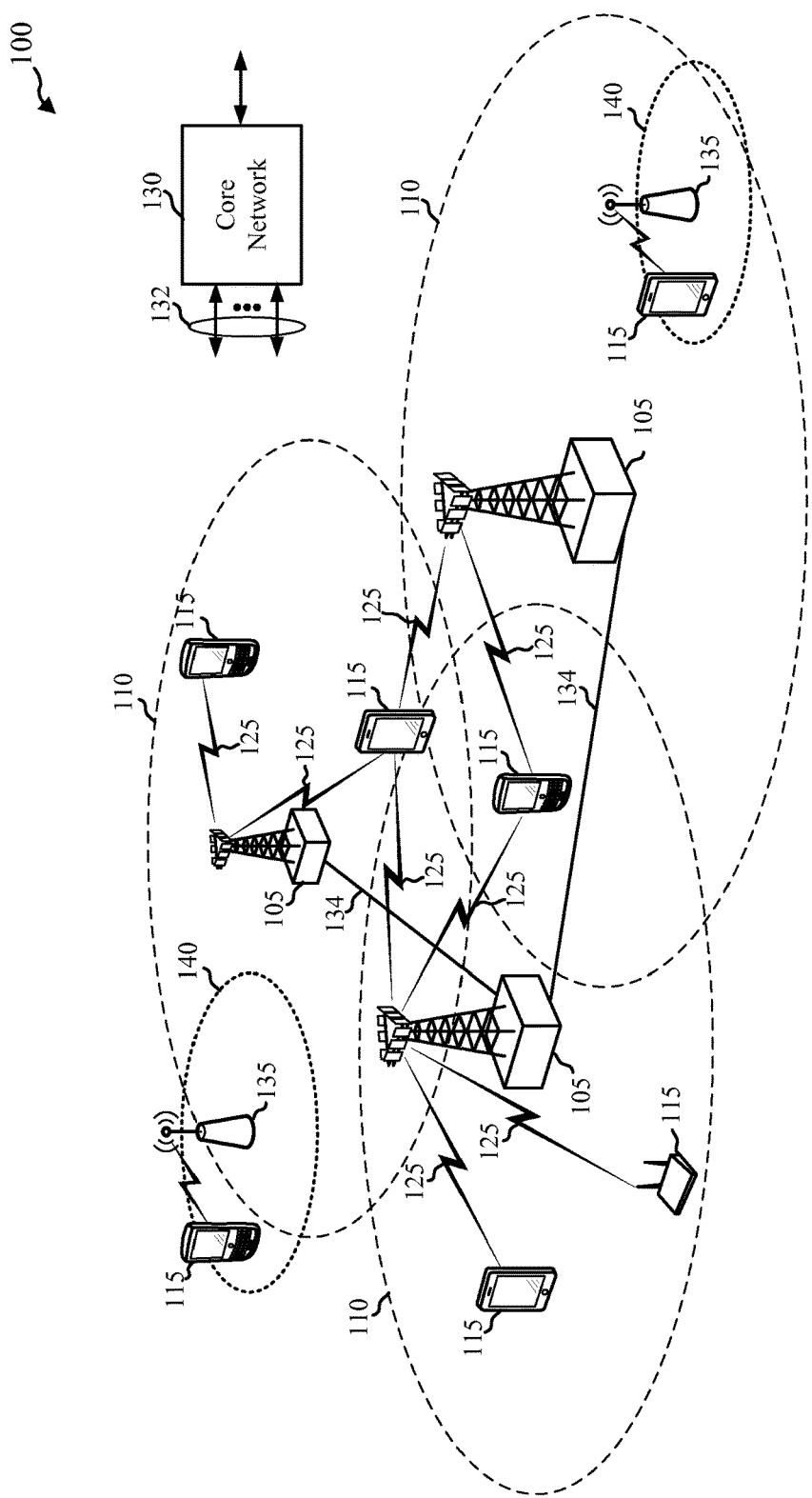
FIG. 1 shows a block diagram of a wireless communication system, in accordance with various aspects of the present disclosure.

Techniques are described in which frame structures for transmissions using an unlicensed radio frequency spectrum band are enhanced. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or Long Term Evolution (LTE)/LTE-Advanced (LTE-A) use in an unlicensed radio frequency spectrum band). In some examples, the unlicensed radio frequency spectrum band may be used for cellular communications (e.g., LTE communications and/or LTE-A communications).

A contention access protocol such as a Listen Before Talk (LBT) configured for load based equipment (LBT-LBE) protocol may be used to mitigate the effects of unfair shared access to a wireless communication medium (e.g., starvation of access to an unlicensed radio frequency spectrum band). However, in contrast to an LBT configured for frame based equipment (LBT-FBE) protocol in which a transmitter performs one clear channel assessment (CCA) procedure per radio frame, with access to a medium being achieved or not achieved based on the outcome of the one CCA procedure, an LBT-LBE protocol requires the performance of an extended CCA (eCCA) procedure. The eCCA procedure, in turn, involves the performance of a random number of N CCA procedures.

A network may include multiple user equipments (UEs) and base stations. When the UEs and base stations communicate over the unlicensed radio frequency spectrum band using a time division duplex (TDD) protocol, the UEs and base stations may use the same frequency spectrum band. This may lead to complications in the eCCA procedures of the UEs and/or base stations. The UEs and/or base stations may perform the eCCA procedure each time they complete a transmission using a channel of the unlicensed radio frequency spectrum band. The UEs and/or base stations may perform the eCCA procedure continuously for as long as they are not transmitting. The UEs and/or base stations may also perform the eCCA procedure continuously during any gap in an uplink or downlink transmission. The UEs and/or base stations may then access a channel after one CCA procedure.

The techniques described herein may identify a TDD frame structure with one or more special subframes that may enable the UEs and/or base stations to perform the eCCA procedure successfully and gain access to the unlicensed radio frequency spectrum band. The one or more special subframes may include access procedure portions with adjustable durations. The adjustable durations may allow the UEs and/or base stations to synchronize their LBT procedures and/or information signal transmissions to avoid the complications caused by the sharing of frequency spectrum band using the TDD protocol.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more evolved NodeBs (eNBs)), a plurality of Wi-Fi access points 135, a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. The Wi-Fi access points 135 may communicate with the UEs 115 via one or more Wi-Fi antennas. Each of the base stations 105 and Wi-Fi access points 135 may provide communication coverage for a respective coverage area 110 or 140. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as wireless wide area network (WWAN) and/or wireless local area network (WLAN) radio access technologies (e.g., cellular and/or Wi-Fi radio access technologies). The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to particular users for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band). In other examples, the wireless communication system 100 may support wireless communication using one or more access technologies different from LTE/LTE-A. In LTE/LTE-A communication systems, the term evolved NodeB or eNB may be used, for example, to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar radio frame and/or gating timing, and transmissions from different eNBs may be approximately aligned in time. For asynchronous operation, the eNBs may have different radio frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN (e.g., Wi-Fi) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a particular mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The DL communications and/or UL communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and/or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band and/or an unlicensed radio frequency spectrum band, while OFDMA, SC-FDMA and/or resource block interleaved FDMA waveforms may be used in the communication links 125 for LTE/LTE-A uplink communications in a licensed radio frequency spectrum band and/or an unlicensed radio frequency spectrum band.

In some examples, one or more of the base stations 105 and/or one or more of the UEs 115 may utilize an enhanced frame structure for transmissions using the unlicensed radio frequency spectrum band. The enhanced frame structure may include special subframes that provide adjustable durations for performing procedures to gain access to the unlicensed radio frequency spectrum band. The adjustable durations in the frame structures may allow the base stations 105 and/or UEs 115 to synchronize their access procedures and channel usage signals. The access procedures performed by the base stations 105 and/or UEs 115 may share values to aid in the synchronization.

Figure 2:
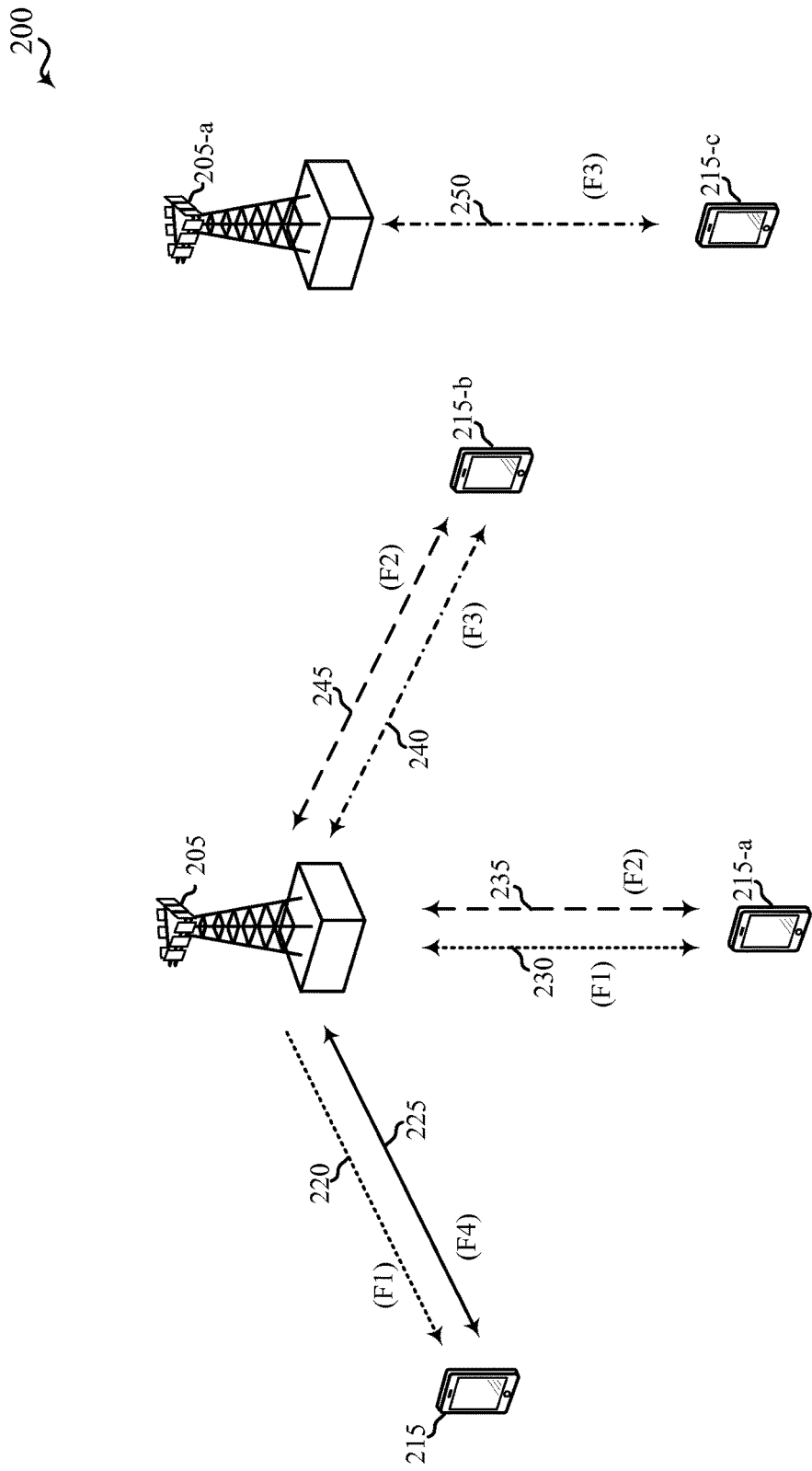
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). A supplemental downlink scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, and/or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and unlicensed access radio frequency spectrum for capacity offload.

As described above, one type of service provider that may benefit from the capacity offload offered by using LTE/LTE-A in unlicensed access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplex-time division duplex (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, and/or resource block interleaved FDMA waveforms from the fourth UE 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-*a* described with reference to FIG. 1 and/or 2, and/or one of the UEs 115, 215, 215-*a*, 215-*b*, and/or 215-*c* described with reference to FIG. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a contention procedure, such as a CCA procedure. In some examples (e.g., LBT-LBE examples), the CCA procedure may include an eCCA procedure. The outcome of the CCA or the eCCA procedure may indicate to the transmitting apparatus whether a channel of an unlicensed radio frequency spectrum band is available or in use during the gating interval (also referred to as an LBT radio frame or a CCA radio frame). When a CCA or an eCCA procedure indicates that the channel is available (e.g., "clear" for use) during a corresponding LBT radio frame, the transmitting apparatus may reserve and/or use the channel of the unlicensed radio frequency spectrum band during part or all of the LBT radio frame. When the CCA or the eCCA procedure indicates that the channel is not available (e.g., that the channel is in use or reserved by another apparatus), the transmitting apparatus may be prevented from using the channel during the LBT radio frame.

In some examples of an LBT-LBE protocol, a transmitting apparatus may perform an eCCA procedure by selecting a random integer, N, between 1 and q, where q has a value of $4 \leq q \leq 32$ advertised by an operator or vendor. Upon selecting a value for the random integer, N, the transmitting apparatus may wait to access an unlicensed radio frequency spectrum band for N CCA procedures where a channel of the unlicensed radio frequency spectrum band is found to be clear. The value of N may be shared with other transmitting apparatus in a deployment. Upon the channel of the unlicensed radio frequency spectrum band being found clear for the N CCA procedures, the transmitting apparatus may transmit over the unlicensed radio frequency spectrum band. After completing the transmission, the transmitting apparatus may perform another eCCA procedure. A maximum channel occupancy time (i.e., MaxChannelOccupancyTime) may be based at least in part on a number of subframes in the frame structure. In some examples, a frame may include 10 subframes. The 10 subframes may correspond to a virtual LBT frame. Upon receiving a transmission from the transmitter, a receiver may immediately begin an acknowledgement/non-acknowledgement (ACK/NAK) transmission, provided the last successful CCA procedure or eCCA procedure was performed less than MaxChannelOccupancyTime ago.

One advantage of an LBT-LBE protocol over an LBT-FBE protocol is that a transmitter (or transmitting apparatus) persistently attempts to access a medium. The transmitter attempts to access the medium for a random duration of at least N CCA procedures. A smaller value of q implies a shorter maximum eCCA procedure duration and shorter radio frame length. One disadvantage of an LBT-LBE protocol is that, when a plurality of transmitters share a frequency spectrum, the continuous CCA procedures of the plurality of transmitters may potentially interfere with one another.

In some examples of an LBT-LBE protocol, the eCCA procedure of the transmitting apparatus may be performed during an access procedure portion of a special subframe. The number of CCA procedures performed during the access procedure portion of the special subframe may be adjusted based on the duration of the access procedure portion. The duration may be adjusted based at least in part on the channel occupancy time and the parameter q. Each time a CCA procedure is performed during the access procedure portion of the special frame, the value of N is decreased by one. The eCCA procedure may continue until the value of N reaches zero, at which point, a channel usage signal may be transmitted.

Figure 3:
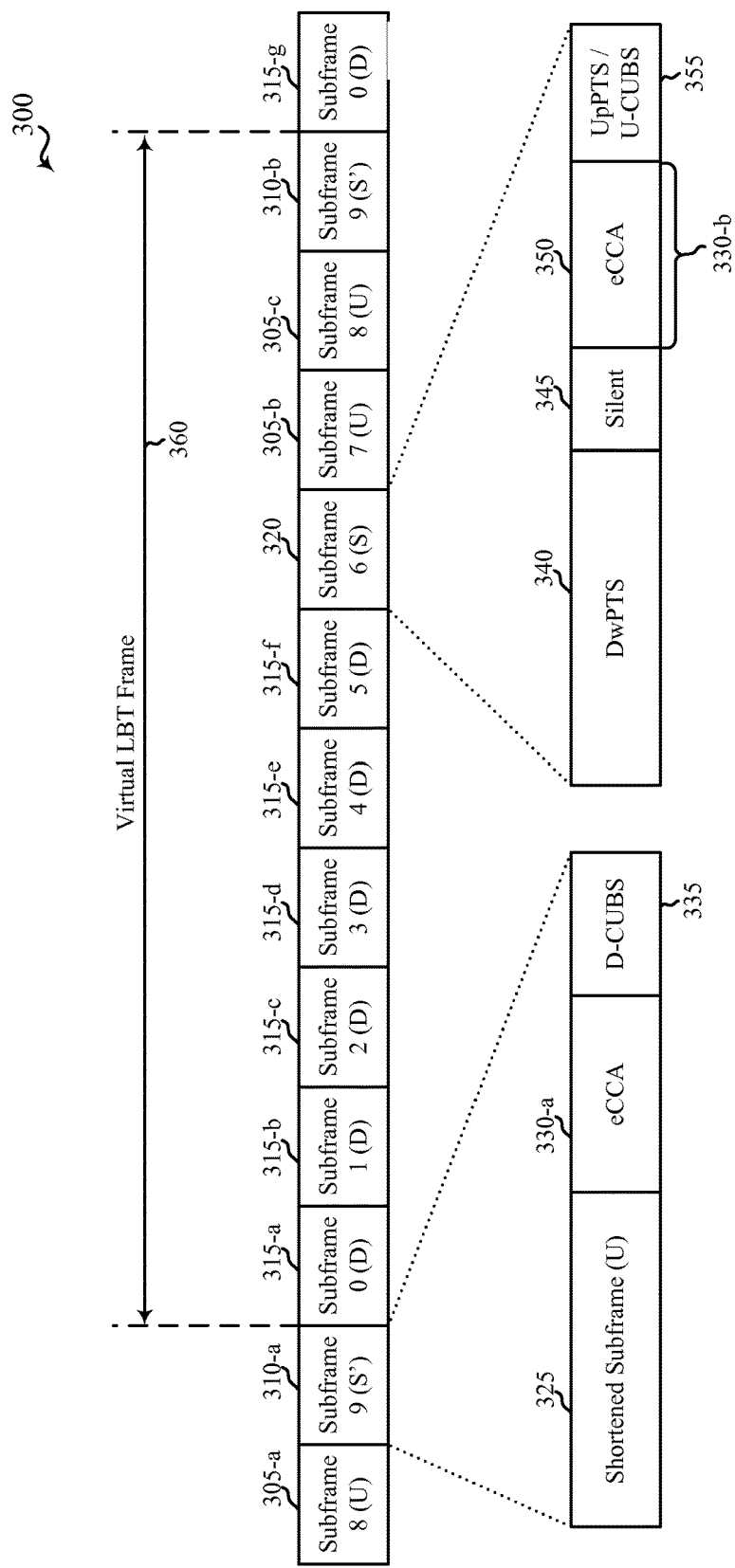
FIG. 3 shows an example of a frame structure for wireless communications over an unlicensed radio frequency spectrum band, in accordance with various aspects of the present disclosure.

FIG. 3 shows an example of a frame structure 300 for wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band).

By way of example, the frame structure 300 shown in FIG. 3 may include uplink subframes 305 and downlink subframes 315. The frame structure may further include downlink special subframes 310 and uplink special subframes 320. The downlink special subframes 310 may occur prior to the transmission of downlink subframes 315, and the uplink special subframes 320 may occur prior to the transmission of uplink subframes 305. In some examples, a downlink special subframe 310-a may be positioned after an uplink subframe 305-a and prior to downlink subframes 315-a through 315-f. An uplink special subframe 320 may be positioned after the downlink subframes 315-a through 315-f and prior to uplink subframes 305-b and 305-c. A next downlink special subframe 310-b may follow uplink subframe 305-c. The next downlink special subframe 310-b may be followed by additional downlink subframe 315-g.

The downlink subframes 315-a through 315-f, uplink special subframe 320, uplink subframes 305-b and 305-c, and a downlink special subframe 310-b may form a virtual LBT frame 360. The uplink subframes 305, downlink special subframes 310, downlink subframes 315, and uplink special subframes 320 may continue in a similar pattern and may form additional virtual LBT frames (not shown) before and after the virtual LBT frame 360.

In some examples, each downlink special subframe 310 may include a shortened uplink subframe 325, an access procedure portion 330-a, and a downlink channel usage beacon signal (D-CUBS) 335. The shortened uplink subframe 325 may include data for an uplink transmission. The access procedure portion 330-a may be used for an LBT procedure. In some examples, the LBT procedure may be an eCCA procedure. The D-CUBS 335 may provide an indication to other UEs and/or apparatuses (e.g., base stations, Wi-Fi access points, etc.) that a channel is reserved for downlink transmissions based on a successful access procedure.

In some examples, each uplink special subframe 320 may include a downlink pilot time slot (DwPTS) 340, an access procedure portion 330-b, and an uplink pilot time slot and/or uplink channel usage beacon signal (UpPTS/U-CUBS) 355. A sub-portion of the uplink special subframe 320 may include a silent period 345. Data may not be transmitted during the silent period 345. In some examples, an eCCA procedure 350 may follow the silent period 345. The UpPTS/U-CUBS 355 may provide an indication to other UEs and/or apparatuses (e.g., base stations, Wi-Fi access points, etc.) that a channel is reserved for uplink transmissions based on a successful access procedure.

The access procedure portions 330 may be adjustable. Adjusting the access procedure portions 330 may adjust the duration of eCCA procedures. Adjusting the access procedure portion 330-a may also adjust the starting time and the duration of the D-CUBS 335. Adjusting the access procedure portion 330-a may allow scheduled eNBs of the same deployment utilizing the frame structure 300 to synchronize their eCCA procedures and their D-CUBS transmissions. Adjusting the access procedure portion 330-b may also adjust the starting time and the duration of the UpPTS/U-CUBS 355. Adjusting the access procedure portion 330-b may allow scheduled UEs of the same deployment utilizing the frame structure 300 to resynchronize their eCCA procedures and their U-CUBS transmissions. The silent period 345 may also be adjusted. Adjusting the silent period 345 may further adjust the duration of the eCCA procedure 350.

UEs and/or base stations may utilize the frame structure 300. When the frame structure 300 is utilized by UEs and base stations, the eCCA procedure for UEs may be separate and independent from the eCCA procedure for base stations. The UEs and base stations may utilize the same or different q values in determining the duration of the access procedure portions 330. The value of q for base stations may be smaller due to a shortened downlink maximum channel occupancy time. The value of q for UEs may be smaller due to a shortened uplink maximum channel occupancy time. The maximum channel occupancy time may be determined by the number of subframes in the virtual LBT frame 360.

For base stations, a value for N may be determined once every LBT frame after the DwPTS 340. The eCCA procedure may begin immediately after the DwPTS 340, and may continue until the next downlink subframe 315-g. The value of N may be shared among all other base stations in a deployment. The base stations in a deployment may try to synchronize their transmissions of the D-CUBS 335.

For UEs, a value for N may be determined once every LBT frame after the shortened subframe (U) 325. The eCCA procedure may begin after the shortened uplink subframe 325 and may continue until the transmission of the UpPTS/U-CUBS 355. The value of N may be shared among all other UEs in a deployment. The UEs in a deployment may try to synchronize their transmissions of the UpPTS/U-CUBS 355.

The eCCA procedure may include a counter with a value N. The counter may decrement every time a successful CCA procedure is performed. If the counter reaches zero before a boundary to perform a D-CUBS transmission, a simple CCA procedure may be performed in order to start to transmit the D-CUBS 335 at the synchronization boundary. Similarly, if the counter reaches zero before a boundary to perform a U-CUBS transmission, a simple CCA procedure may be performed in order to start to transmit the UpPTS/U-CUBS 355 at the synchronization boundary.

The boundaries for D-CUBS and U-CUBS may be determined by the access procedure portions 330. The boundaries may be based at least in part on the value of q. The value of q for a base station may be determined by a maximum downlink duration, and the value of q for a UE may be determined by a maximum uplink duration. The D-CUBS transmission and the U-CUBS transmission may each include at least one OFDM symbol.

The value for q for UEs may be same as the value of q for base stations. Alternatively, the value for q may different between UEs and base stations. When both UEs and base stations are utilizing the frame structure 300, the LBT procedures being performed by the UEs and base stations may overlap in time.

One channel access approach may be to set the value of q based at least in part on the maximum uplink and downlink transmission durations. For example, if the split between the uplink and the downlink is approximately 50/50, approximately 0.25 ms may be utilized for the eCCA procedure. Another channel access approach may be to utilize approximately 0.5 ms for the eCCA procedure in the downlink special subframe 310-a, and approximately 0.5 ms for the eCCA procedure in the uplink special subframe 320.

The values for q may be determined by accessing a database that specifies values for q. A value for q may then be selected from the database. The value of q may be conveyed to UEs and/or base stations via a unicast or broadcast transmission. The value of q may be conveyed, for example, when there is an uplink or downlink configuration change. Alternatively or in addition, the value of q may be conveyed as part of an adaptive algorithm of a base station.

Figure 4:
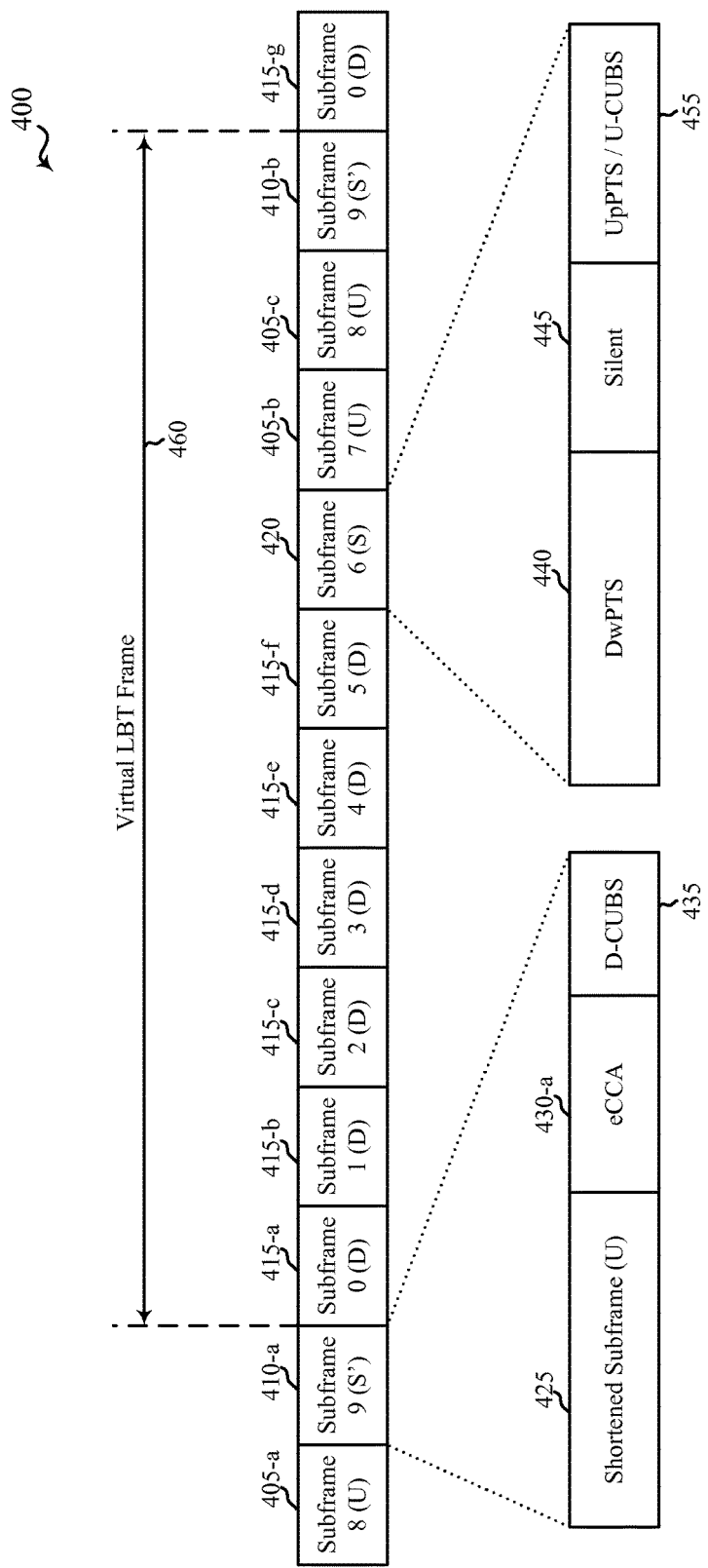
FIG. 4 shows an example of a frame structure for wireless communications over an unlicensed radio frequency spectrum band, in accordance with various aspects of the present disclosure.

FIG. 4 shows an example of a frame structure 400 for wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band).

By way of example, the frame structure 400 shown in FIG. 4 may include uplink subframes 405 and downlink subframes 415. The frame structure may further include downlink special subframes 410 and uplink special subframes 420. The downlink special subframes 410 may occur prior to the transmission of downlink subframes 415, and the uplink special subframes 420 may occur prior to the transmission of uplink subframes 405. In some examples, a downlink special subframe 410-a may be positioned after an uplink subframe 405-a and prior to downlink subframes 415-a through 415-f. An uplink special subframe 420 may be positioned after the downlink subframes 415-a through 415-f and prior to uplink subframes 405-b and 405-c. A next downlink special subframe 410-b may follow uplink subframe 405-c. The next downlink special subframe 410-b may be followed by additional downlink subframe 415-g.

The downlink subframes 415-a through 415-f, uplink special subframe 420, uplink subframes 405-b and 405-c, and a downlink special subframe 410-b may form a virtual LBT frame 460. The uplink subframes 405, downlink special subframes 410, downlink subframes 415, and uplink special subframes 420 may continue in a similar pattern and may form additional virtual LBT frames (not shown) before and after the virtual LBT frame 460.

In some examples, each downlink special subframe 410 may include a shortened uplink subframe 425, an access procedure portion 430-a, and a D-CUBS 435. The shortened uplink subframe 425 may include data for an uplink transmission. The access procedure portion 430-a may be used for an LBT procedure. In some examples, the LBT procedure may be an eCCA procedure. The D-CUBS 435 may provide an indication to other UEs and/or apparatuses (e.g., base stations, Wi-Fi access points, etc.) that a channel is reserved for downlink transmissions based on a successful access procedure.

In some examples, each uplink special subframe 420 may include a DwPTS 440, a silent period 445, and an UpPTS/U-CUBS 455. Data may not be transmitted during the silent period. The UpPTS/U-CUBS 455 may provide an indication to other UEs and/or apparatuses (e.g., base stations, Wi-Fi access points, etc.) that a channel is reserved for uplink transmissions.

The access procedure portions 430 may be adjustable. Adjusting the access procedure portion 430-a may adjust the duration of eCCA procedures. Adjusting the access procedure portion 430-a may also adjust the starting time and the duration of the D-CUBS 435. Adjusting the access procedure portion 430-a may allow the eNBs of the same deployment utilizing the frame structure 400 to synchronize their eCCA procedures and their D-CUBS transmissions.

Figure 5:
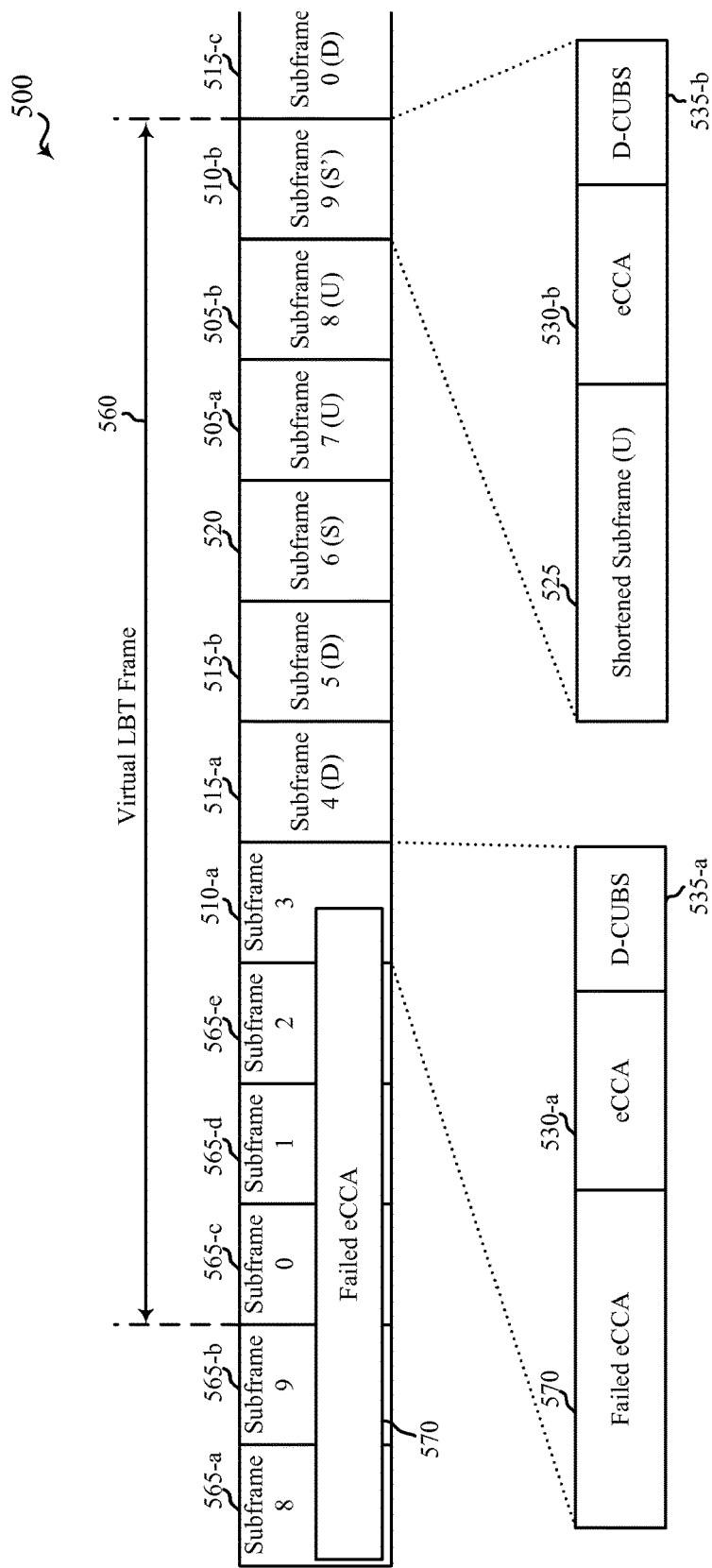
FIG. 5 shows an example of a frame structure for wireless communications over an unlicensed radio frequency spectrum band, in accordance with various aspects of the present disclosure.

FIG. 5 shows an example of a frame structure 500 for wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band).

By way of example, the frame structure 500 shown in FIG. 5 may include uplink subframes 505 and downlink subframes 515. The frame structure may further include downlink special subframes 510 and uplink special subframes 520. The downlink special subframes 510 may occur prior to the transmission of downlink subframes 515, and the uplink special subframes 520 may occur prior to the transmission of uplink subframes 505. The frame structure 500 also may include failed eCCA subframes 565-a through 565-e. The failed eCCA subframes 565 may not be used for transmissions due to a failed eCCA procedure 570. The failed eCCA procedure 570 may be caused by a busy channel. In some examples, a downlink special subframe 510-a may be positioned at the end of the failed eCCA procedure 570. Downlink subframes 515-a and 515-b may follow the downlink special subframe 510-a. An uplink special subframe 520 may be positioned after the downlink subframes 515-a and 515-b and prior to uplink subframes 505-a and 505-b. A next downlink special subframe 510-b may follow uplink subframe 505-b. The next downlink special subframe 510-b may be followed by additional downlink subframe 515-c.

The failed eCCA subframes 565-c through 565-e, downlink subframes 515-a and 515-b, uplink special subframe 520, uplink subframes 505-a and 505-b, and downlink special subframes 510-a and 510-b may form a virtual LBT frame 560. When the channel is clear, the uplink subframes 505, downlink special subframes 510, downlink subframes 515, and uplink special subframes 520 may form additional virtual LBT frames (not shown) before and after the virtual LBT frame 560, using a similar pattern as shown in the virtual LBT frames 360 and/or 460 as shown in FIG. 3 and/or 4.

In some examples, the downlink special subframe 510-a may include a failed eCCA procedure 570, an access procedure portion 530-a, and a D-CUBS 535. During the failed eCCA procedure 570, CCA procedures may be continuously performed. The access procedure portion 530-a may begin upon the occurrence of a successful CCA procedure. In some examples, the access procedure portion 530-*a* may include an eCCA procedure. The D-CUBS 535 may provide an indication to other UEs and/or apparatuses (e.g., base stations, Wi-Fi access points, etc.) that a channel is reserved for downlink transmissions based on a successful access procedure. The D-CUBS 535-*a* may be transmitted until the start of the next subframe. The remaining downlink subframes 515-*a* and 515-*b* of the virtual LBT frame 560 may transmitted after the D-CUBS 535-*a*. The eCCA procedure of the access procedure portion 530-*a* and the D-CUBS 535-*a* may not be synchronized with other UEs or base stations due to the delay caused by the failed eCCA procedure 570.

In some examples, the uplink special subframe 520 may be an example of the uplink special subframes 320 and/or 420 described with reference to FIG. 3 and/or 4. The downlink special subframe 510-*b* may be an example of the downlink special subframes 310 and/or 410 described with reference to FIG. 3 and/or 4.

The access procedure portion 530-*b* of downlink special subframe 510-*b* may be adjustable. Adjusting the access procedure portion 530-*b* may adjust the duration of an eCCA procedure and a D-CUBS 535-*b*. Adjusting the access procedure portion 530-*b* may allow UEs and/or base stations of the same deployment to resynchronize their eCCA procedures and their D-CUBS transmissions.

Figure 6:
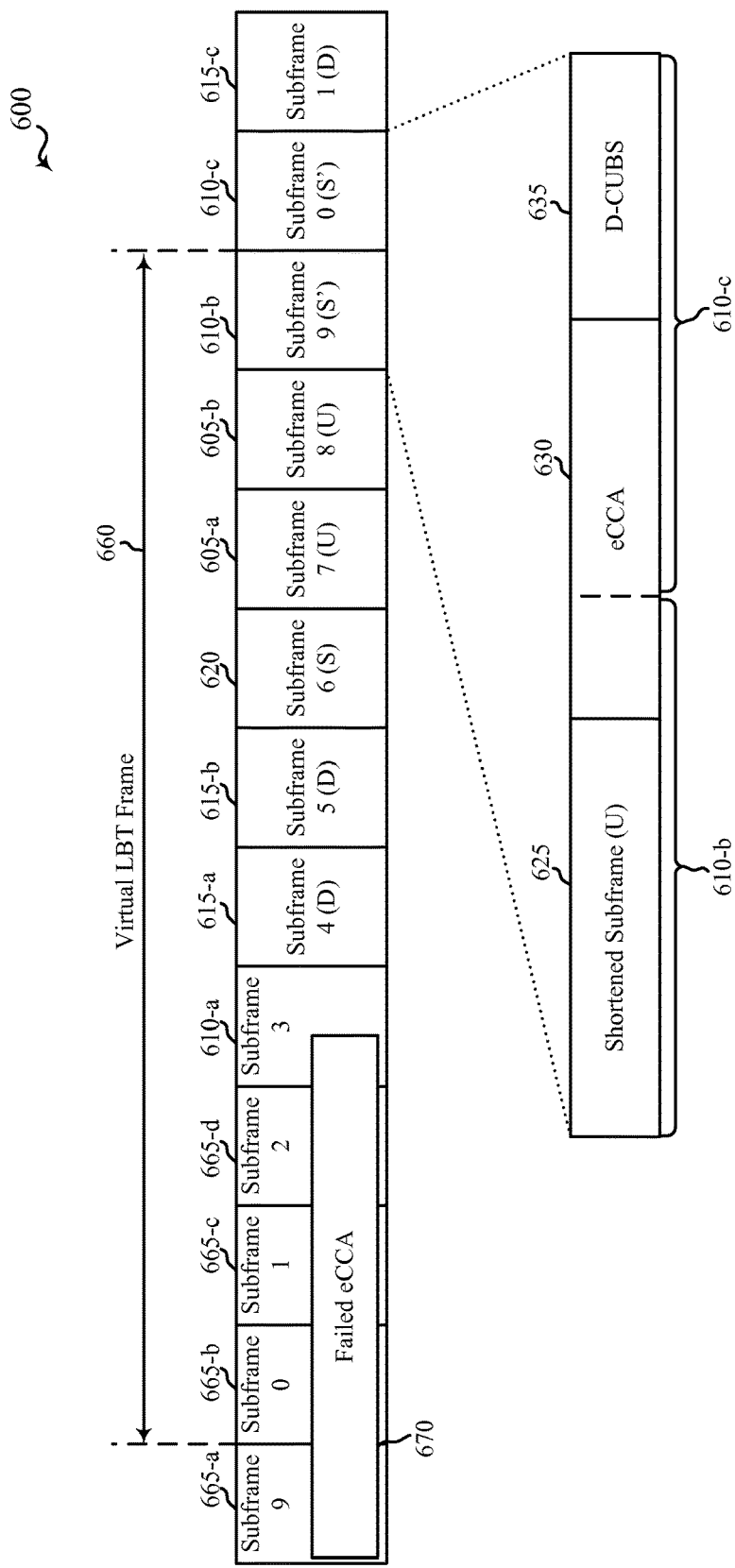
FIG. 6 shows an example of a frame structure for wireless communications over an unlicensed radio frequency spectrum band, in accordance with various aspects of the present disclosure.

FIG. 6 shows an example of a frame structure 600 for wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band).

By way of example, the frame structure 600 shown in FIG. 6 may include uplink subframes 605 and downlink subframes 615. The frame structure may further include downlink special subframes 610 and uplink special subframes 620. The downlink special subframes 610 may occur prior to the transmission of downlink subframes 615, and the uplink special subframes 620 may occur prior to the transmission of uplink subframes 605. The frame structure 600 also may include failed eCCA subframes 665-*a* through 665-*d*. The failed eCCA subframes 665 may not be used for transmissions due to a failed eCCA procedure 670. Each of the failed eCCA subframes 665 may include the failed eCCA procedure 670. The failed eCCA procedure 670 may be caused by a busy channel. In some examples, a downlink special subframe 610-*a* may be positioned at the end of the failed eCCA procedure 670. The downlink special subframe 610-*a* may be an example of the downlink special subframe 510-*a* described with reference to FIG. 5. Downlink subframes 615-*a* and 615-*b* may follow the downlink special subframe 610-*a*. An uplink special subframe 620 may be positioned after the downlink subframes 615-*a* and 615-*b* and prior to uplink subframes 605-*a* and 605-*b*. The uplink special subframe 620 may be an example of the uplink special subframes 320 and/or 420 described with reference to FIG. 3 and/or 4. A next downlink special subframe 610-*b* and a third downlink special subframe 610-*c* may follow uplink subframe 605-*b*. The third downlink special subframe 610-*c* may be followed by additional downlink subframe 615-*c*.

The failed eCCA subframes 665-*b* through 665-*d*, downlink subframes 615-*a* and 615-*b*, uplink special subframe 620, uplink subframes 605-*a* and 605-*b*, and downlink special subframes 610-*a* and 610-*b* may form a virtual LBT frame 660. When the channel is clear, the uplink subframes 605, downlink special subframes 610, downlink subframes 615, and uplink special subframes 620 may form additional virtual LBT frames (not shown) before and after the virtual LBT frame 660, using a similar pattern as shown in the virtual LBT frames 360 and/or 460 as shown in FIG. 3 and/or 4.

In some examples, the downlink special subframe 610-*b* may include a shortened uplink subframe 625 and the beginning of an access procedure portion 630. If the access procedure is unsuccessful, then the access procedure portion 630 may continue into the third downlink special subframe 610-*c*. The third downlink special subframe 610-*c* may include a D-CUBS 635 at the conclusion of the access procedure portion 630. The access procedure portion 630 may include an LBT procedure. In some examples, the LBT procedure may be an eCCA procedure. The D-CUBS 635 may provide an indication to other UEs and/or apparatuses (e.g., base stations, Wi-Fi access points, etc.) that a channel is reserved for downlink transmissions based on a successful access procedure.

Figure 7:
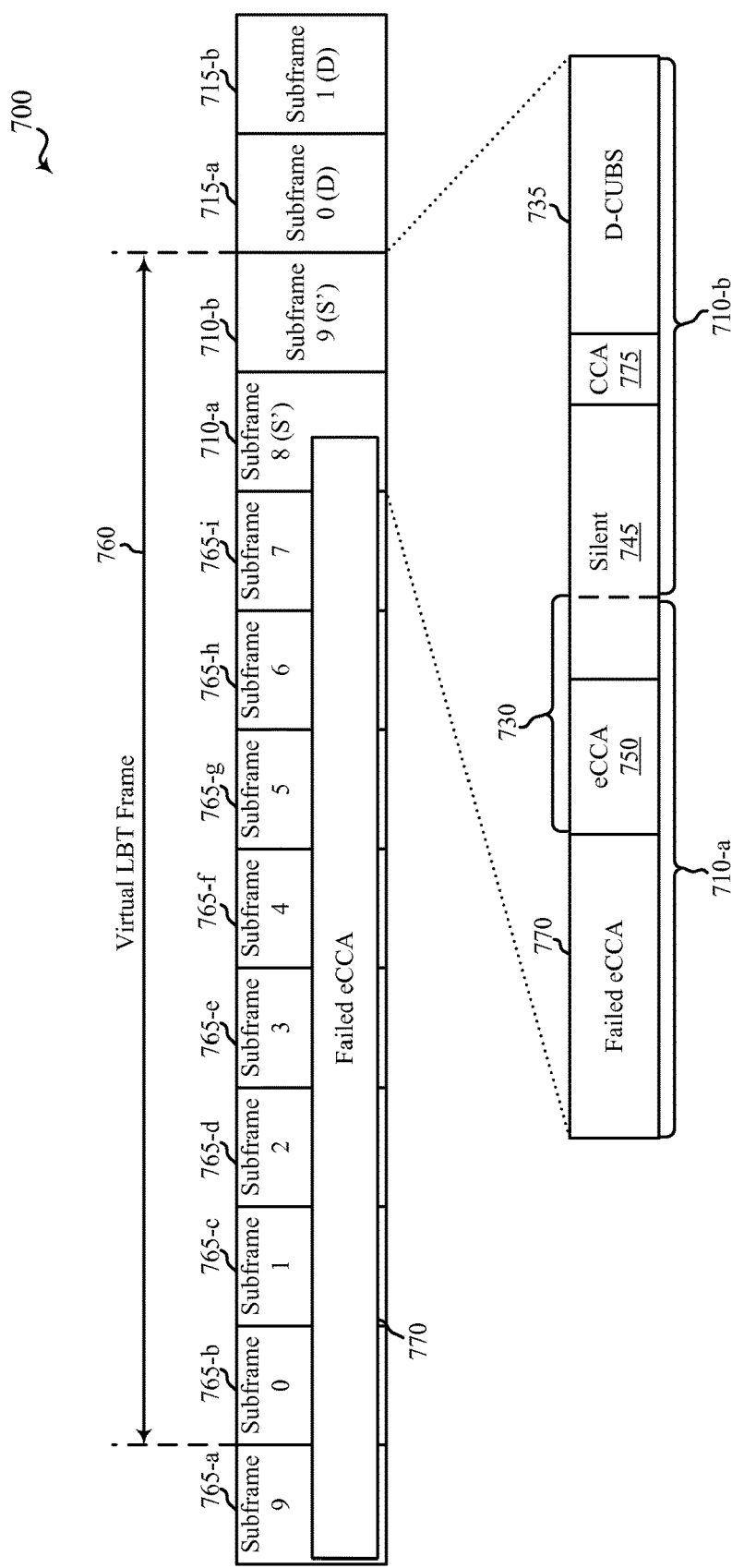
FIG. 7 shows an example of a frame structure for wireless communications over an unlicensed radio frequency spectrum band, in accordance with various aspects of the present disclosure.

FIG. 7 shows an example of a frame structure 700 for wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band).

By way of example, the frame structure 700 shown in FIG. 7 may include downlink subframes 715. The frame structure may further include downlink special subframes 710. The downlink special subframes 710 may occur prior to the transmission of downlink subframes 715. The frame structure 700 also may include failed eCCA subframes 765-*a* through 765-*i*. The failed eCCA subframes 765 may not be used for transmissions due to a failed eCCA procedure 770. Each of the failed eCCA subframes 765 may include the failed eCCA procedure 770. The failed eCCA procedure 770 may be caused by a busy channel. In some examples, a downlink special subframe 710-*a* may be positioned at the end of the failed eCCA procedure 770. A next downlink special subframe 710-*b* may follow the downlink special subframe 710-*a*. Downlink subframes 715-*a* and 715-*b* may follow the downlink special subframe 710-*a*.

The failed eCCA subframes 765-*b* through 765-*i* and downlink special subframes 710-*a* and 710-*b* may form a virtual LBT frame 760. When the channel is clear, uplink subframes (not shown), downlink special subframes 710, downlink subframes 715, and uplink special subframes (not shown) may form additional virtual LBT frames (not shown) before and after the virtual LBT frame 760, using a similar pattern as shown in the virtual LBT frames 360 and/or 460 as shown in FIG. 3 and/or 4.

In some examples, the downlink special subframe 710-*a* may include a failed eCCA procedure 770 and the beginning of an access procedure portion 730. The downlink special subframe 710-*b* may further include a D-CUBS 735 at the conclusion of the access procedure portion 730. During the failed eCCA procedure 770, CCA procedures may be continuously performed. The access procedure portion 730 may begin upon the occurrence of a successful CCA procedure. In some examples, the access procedure portion 730 may include an eCCA procedure 750. The downlink special subframe 710-b may further include a silent period 745 and a simple CCA procedure 775. The D-CUBS 735 may provide an indication to other UEs and/or apparatuses (e.g., base stations, Wi-Fi access points, etc.) that a channel is reserved for downlink transmissions based on a successful access procedure.

The eCCA procedure 750 may include a counter with a value N. The counter may decrement every time a CCA procedure is performed. If the counter reaches zero before a boundary to perform a D-CUBS transmission, a simple CCA procedure 775 may be performed prior to the next boundary for a D-CUBS transmission. The interval between the eCCA procedure 750 and the simple CCA procedure 775 may be filled with a silent period 745. The silent period 745 may reduce interference with other UEs and/or base stations performing access procedures.

Figure 8:
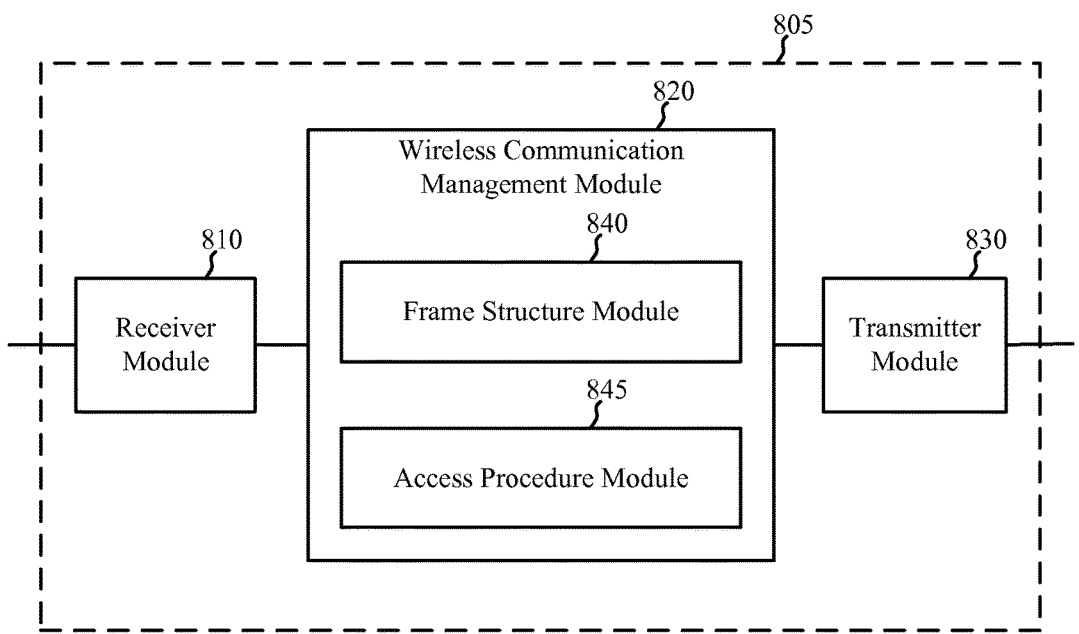
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more of the base station 105, base station 205, base station 205-a, UE 115, UE 215, UE 215-a, UE 215-b, and/or UE 215-c described with reference to FIG. 1 and/or 2. In some examples, the apparatus 805 may be part or include an LTE/LTE-A eNB and/or an LTE/LTE-A base station. The apparatus 805 may also be a processor. In some examples, the apparatus 805 may be referred to as a transmitter or a transmitter apparatus. The apparatus 805 may include a receiver module 810, a wireless communication management module 820, and/or a transmitter module 830. Each of these components may be in communication with each other.

The components of the apparatus 805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIGS. 1-7. The receiver module 810 may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter module 830 may include at least one RF transmitter, such as at least one RF transmitter operable to transmit over the licensed radio frequency spectrum band and/or the unlicensed radio frequency spectrum band. The transmitter module 830 may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management module 820 may be used to manage various aspects of wireless communication with other apparatuses and may include a frame structure module 840 and/or an access procedure module 845.

In some examples, the frame structure module 840 may be used to determine a frame structure for the apparatus 805 to use to communicate over an unlicensed frequency spectrum band. The frame structure may include special subframes with adjustable access procedure portions. In some examples, the access procedure module 845 may be used to adjust the access procedure portions of the special subframes, and to perform the access procedures. The access procedures may include LBT procedures such as eCCA procedures.

Figure 9:
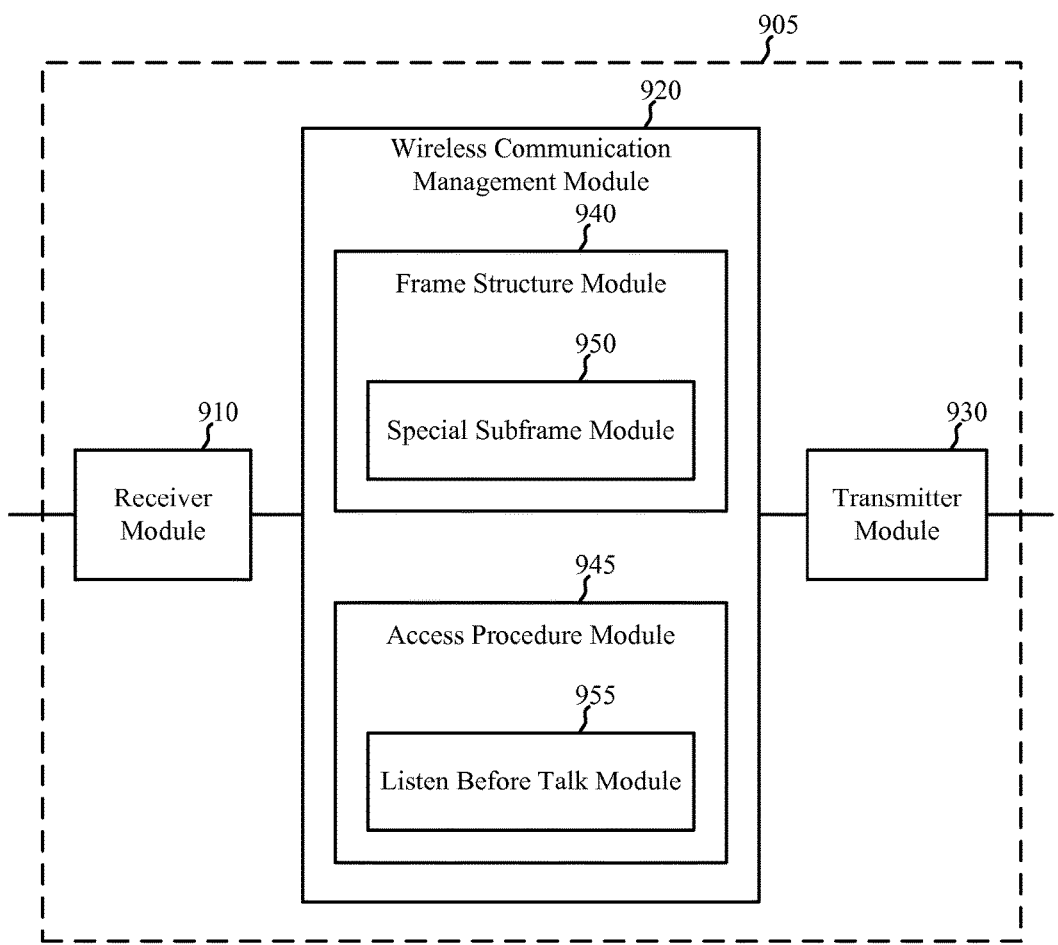
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base station 105, base station 205, base station 205-a, UE 115, UE 215, UE 215-a, UE 215-b, and/or UE 215-c described with reference to FIG. 1 and/or 2, and/or an example of aspects of the apparatus 805 described with reference to FIG. 8. In some examples, the apparatus 905 may be part or include an LTE/LTE-A eNB and/or an LTE/LTE-A base station. The apparatus 905 may also be a processor. In some examples, the apparatus 905 may be referred to as a transmitter or transmitter apparatus. The apparatus 905 may include a receiver module 910, a wireless communication management module 920, and/or a transmitter module 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may be an example of one or more aspects of the receiver module 810 described with reference to FIG. 8. In some examples, the receiver module 910 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIGS. 1-7. The receiver module 910 may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter module 930 may be an example of one or more aspects of the transmitter module 830 described with reference to FIG. 8. In some examples, the transmitter module 930 may include at least one RF transmitter, such as at least one RF transmitter operable to transmit over the licensed radio frequency spectrum band and/or the unlicensed radio frequency spectrum band. The transmitter module 930 may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management module 920 may be an example of one or more aspects of the wireless communication management module 820 described with reference to FIG. 8. The wireless communication management module 920 may include a frame structure module 940 and/or an access procedure module 945.

In some examples, the frame structure module 940 may be an example of one or more aspects of the frame structure module 840 described with reference to FIG. 8. In some examples, the frame structure module 940 may include a special subframe module 950 used to determine special subframes of a frame structure. The special subframes may include access procedure portions.

In some examples, the access procedure module 945 may be an example of one or more aspects of the access procedure module 845 described with reference to FIG. 8. In some examples, the access procedure module 945 may include a listen before talk module 955. The listen before talk module 955 may perform a listen before talk procedure during one or more of the access procedure portions of the special subframes. The listen before talk procedure may include an eCCA procedure.

Figure 10:
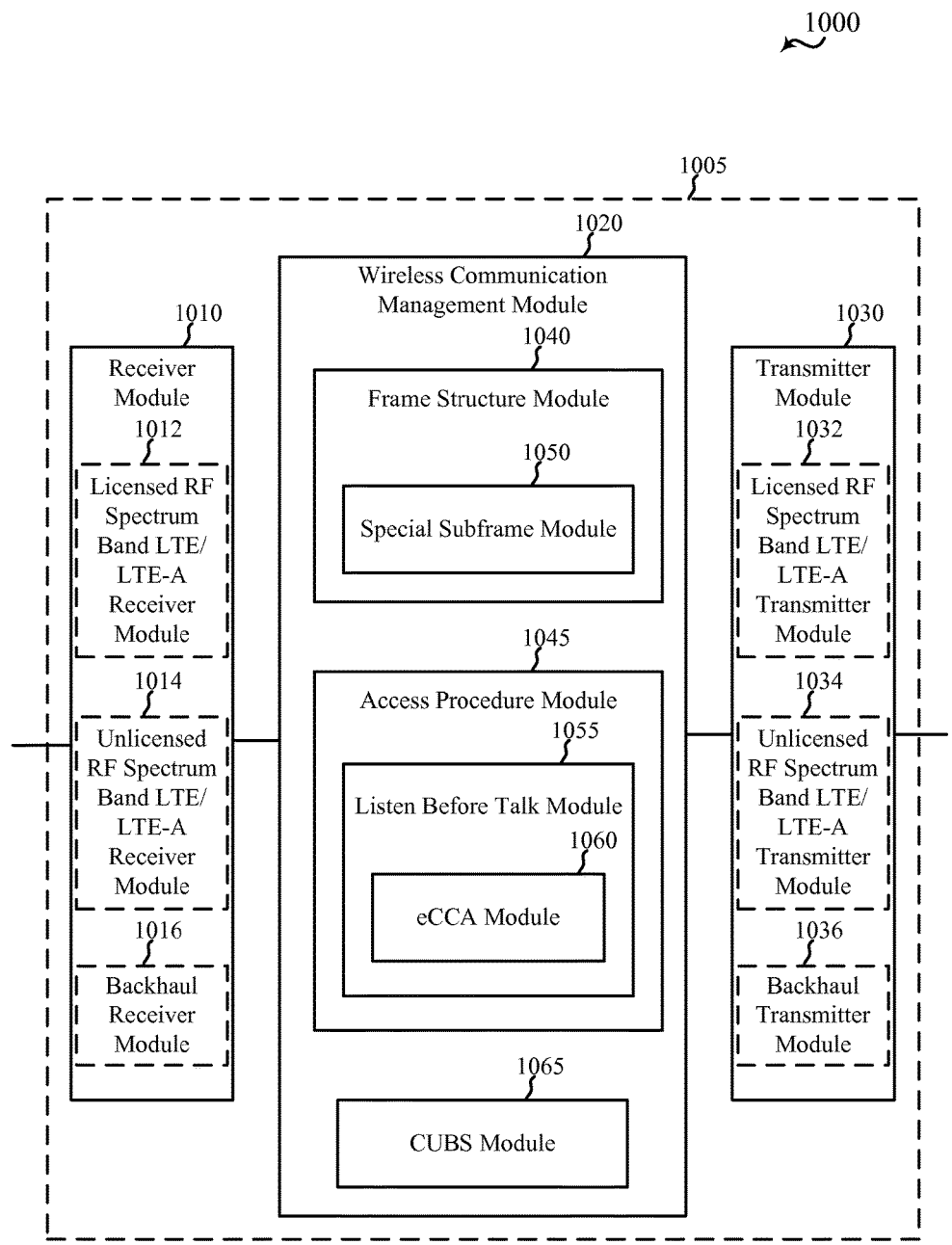
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base station 105, base station 205, base station 205-a, UE 115, UE 215, UE 215-a, UE 215-b, and/or UE 215-c described with reference to FIG. 1 and/or 2, and/or an example of aspects of the apparatus 805 and/or 905 described with reference to FIG. 8 and/or 9. In some examples, the apparatus 1005 may be part or include an LTE/LTE-A eNB and/or an LTE/LTE-A base station. The apparatus 1005 may also be a processor. In some examples, the apparatus 1005 may be referred to as a transmitter or transmitter apparatus. The apparatus 1005 may include a receiver module 1010, a wireless communication management module 1020, and/or a transmitter module 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may be an example of one or more aspects of the receiver module 910 described with reference to FIG. 9. In some examples, the receiver module 1010 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band)). In some examples, the licensed radio frequency spectrum band and/or the unlicensed radio frequency spectrum band may be used for LTE/LTE-A communications, as described, for example, with reference to FIGS. 1-7. The receiver module 1010 may in some cases include separate receivers for the licensed radio frequency spectrum band and the unlicensed radio frequency spectrum band. The separate receivers may, in some examples, take the form of a licensed RF spectrum band LTE/LTE-A receiver module 1012 for communicating over the licensed radio frequency spectrum band, and an unlicensed RF spectrum band LTE/LTE-A receiver module 1014 for communicating over the unlicensed radio frequency spectrum band. The receiver module 1010 may also include a backhaul receiver module 1016 for communicating over a wired or wireless backhaul that connects the apparatus 1005 to other apparatuses (e.g., to a second transmitter, such as a second LTE/LTE-A eNB and/or second LTE/LTE-A base station). The receiver module 1010 may also include receiver modules for communicating over other radio frequency spectrum bands and/or for communicating via other radio access technologies (e.g., Wi-Fi). The receiver module 1010, including the licensed RF spectrum band LTE/LTE-A receiver module 1012, the unlicensed RF spectrum band LTE/LTE-A receiver module 1014, and/or the backhaul receiver module 1016 may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter module 1030 may be an example of one or more aspects of the transmitter module 930 described with reference to FIG. 9. In some examples, the transmitter module 1030 may include at least one RF transmitter, such as at least one RF transmitter operable to transmit over the licensed radio frequency spectrum band and/or the unlicensed radio frequency spectrum band. The transmitter module 1030 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1032 for communicating over the licensed radio frequency spectrum band, and an unlicensed RF spectrum band LTE/LTE-A transmitter module 1034 for communicating over the unlicensed radio frequency spectrum band. The transmitter module 1030 may also include a backhaul transmitter module 1036 for communicating over a wired or wireless backhaul that connects the apparatus 1005 to other apparatuses. The transmitter module 1030, including the licensed RF spectrum band LTE/LTE-A transmitter module 1032, the unlicensed RF spectrum band LTE/LTE-A transmitter module 1034, and/or the backhaul transmitter module 1036 may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management module 1020 may be an example of one or more aspects of the wireless communication management module 920 described with reference to FIG. 9. The wireless communication management module 1020 may include a frame structure module 1040 and/or an access procedure module 1045.

In some examples, the frame structure module 1040 may be an example of one or more aspects of the frame structure module 940 described with reference to FIG. 9. The frame structure module 1040 may include a special subframe module 1050. The special subframe module 1050 may be an example of one or more aspects of the special subframe module 950 described with reference to FIG. 9. The frame structure module 1040 and special subframe module 1050 may be used to determine a frame structure for the apparatus 1005 to use to communicate over an unlicensed frequency spectrum band. The frame structure may include special subframes determined by the special subframe module 1050. The special subframes may include access procedure portions.

In some examples, the access procedure module 1045 may be an example of one or more aspects of the access procedure module 945 described with reference to FIG. 9. The access procedure module 1045 may include a listen before talk module 1055. The listen before talk module 1055 may be an example of one or more aspects of the listen before talk module 955 described with reference to FIG. 9. The listen before talk module 1055 may further include an eCCA module 1060. The eCCA module 1060 may be used to perform an eCCA procedure during one or more of the access procedure portions of the special subframes.

In some examples, the wireless communication management module 1020 may further include channel usage beacon signal (CUBS) module 1065. The CUBS module 1065 may determine a CUBS transmission to transmit after the eCCA procedure is performed by the eCCA module 1060. The CUBS transmission may be a D-CUBS or a U-CUBS transmission.

Figure 11:
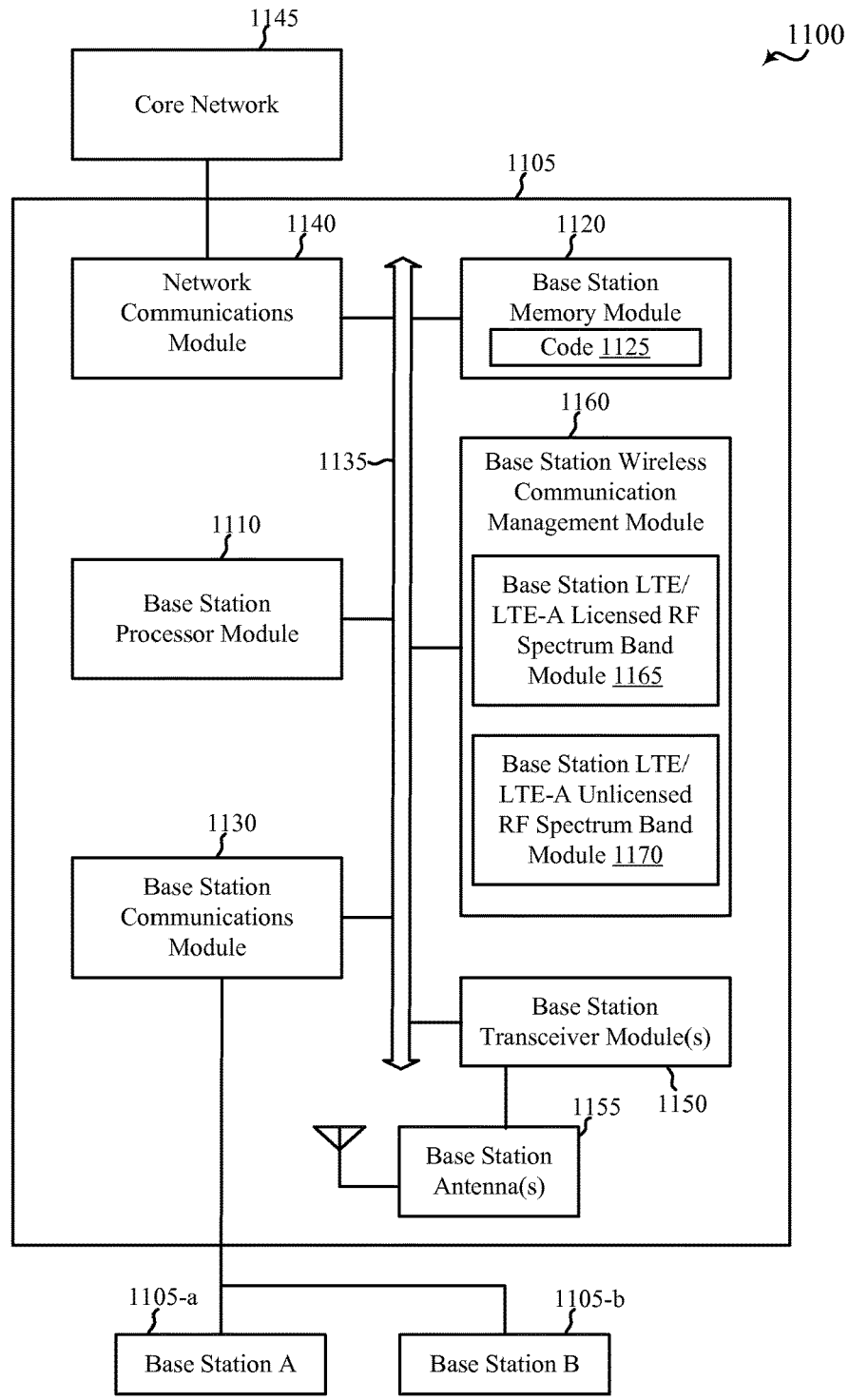
FIG. 11 shows a block diagram of a base station (e.g., a base station forming part or all of an eNB) for use in wireless communication, in accordance with various aspects of the present disclosure.

FIG. 11 shows a block diagram 1100 of a base station 1105 (e.g., a base station forming part or all of an eNB) for use in wireless communication, in accordance with various aspects of the present disclosure. In some examples, the base station 1105 may be an example of aspects of one or more of the base stations 105, 205, and/or 205-*a* described with reference to FIG. 1 and/or 2, and/or aspects of one or more of the apparatuses 805, 905, and/or 1005 when configured as a base station, as described with reference to FIG. 8, 9, and/or 10. The base station 1105 may be configured to implement or facilitate at least some of the base station and/or apparatus features and functions described with reference to FIGS. 1-10.

The base station 1105 may include a base station processor module 1110, a base station memory module 1120, at least one base station transceiver module (represented by base station transceiver module(s) 1150), at least one base station antenna (represented by base station antenna(s) 1155), and/or a base station wireless communication management module 1160. The base station 1105 may also include one or more of a base station communications module 1130 and/or a network communications module 1140. Each of these components may be in communication with each other, directly or indirectly, over one or more buses 1135.

The base station memory module 1120 may include random access memory (RAM) and/or read-only memory (ROM). The base station memory module 1120 may store computer-readable, computer-executable code 1125 containing instructions that are configured to, when executed, cause the base station processor module 1110 to perform various functions described herein related to wireless communication (e.g., functions relating to identification and alignment of contention access protocol timings when using an LBT-LTE protocol, etc.). Alternatively, the code 1125 may not be directly executable by the base station processor module 1110 but be configured to cause the base station 1105 (e.g., when compiled and executed) to perform various functions described herein.

The base station processor module 1110 may include an intelligent hardware device, e.g., a central processing unit (CPU), a microcontroller, an ASIC, etc. The base station processor module 1110 may process information received through the base station transceiver module(s) 1150, the base station communications module 1130, and/or the network communications module 1140. The base station processor module 1110 may also process information to be sent to the transceiver module(s) 1150 for transmission through the antenna(s) 1155, to the base station communications module 1130, for transmission to one or more other base stations 1105-*a* and 1105-*b*, and/or to the network communications module 1140 for transmission to a core network 1145, which may be an example of one or more aspects of the core network 130 described with reference to FIG. 1. The base station processor module 1110 may handle, alone or in connection with the base station wireless communication management module 1160, various aspects of communicating over (or managing communications over) a wireless communication medium including a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available, at least in part, for unlicensed use, such as Wi-Fi use and/or LTE/LTE-A use in an unlicensed radio frequency spectrum band).

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules. The base station transceiver module(s) 1150 may support communications in the licensed radio frequency spectrum band and/or the unlicensed radio frequency spectrum band. The base station transceiver module(s) 1150 may be configured to communicate bi-directionally, via the antenna(s) 1155, with one or more UEs or apparatuses, such as one or more of the UEs 115, 215, 215-*a*, 215-*b*, and/or 215-*c* described with reference to FIG. 1 and/or 2. The base station 1105 may, for example, include multiple base station antennas 1155 (e.g., an antenna array). The base station 1105 may communicate with the core network 1145 through the network communications module 1140. The base station 1105 may also communicate with other base stations, such as the base stations 1105-*a* and 1105-*b*, using the base station communications module 1130.

The base station wireless communication management module 1160 may be configured to perform and/or control some or all of the features and/or functions described with reference to FIGS. 1-10 related to wireless communication (e.g., functions relating to determining a frame structure for communicating over an unlicensed radio frequency spectrum band, etc.). In some examples, the base station wireless communication management module 1160 may be configured to support a supplemental downlink mode, a carrier aggregation mode, and/or a standalone mode using the licensed radio frequency spectrum band and/or the unlicensed radio frequency spectrum band. The base station wireless communication management module 1160 may include a base station LTE/LTE-A licensed RF spectrum band module 1165 configured to handle LTE/LTE-A communications in the licensed radio frequency spectrum band, and a base station LTE/LTE-A unlicensed RF spectrum band module 1170 configured to handle LTE/LTE-A communications in the unlicensed radio frequency spectrum band. The base station wireless communication management module 1160, or portions of it, may include a processor, and/or some or all of the functions of the base station wireless communication management module 1160 may be performed by the base station processor module 1110 and/or in connection with the base station processor module 1110. In some examples, the base station wireless communication management module 1160 may be an example of the wireless communication management module 820, 920, and/or 1020 described with reference to FIG. 8, 9, and/or 10.

Figure 12:
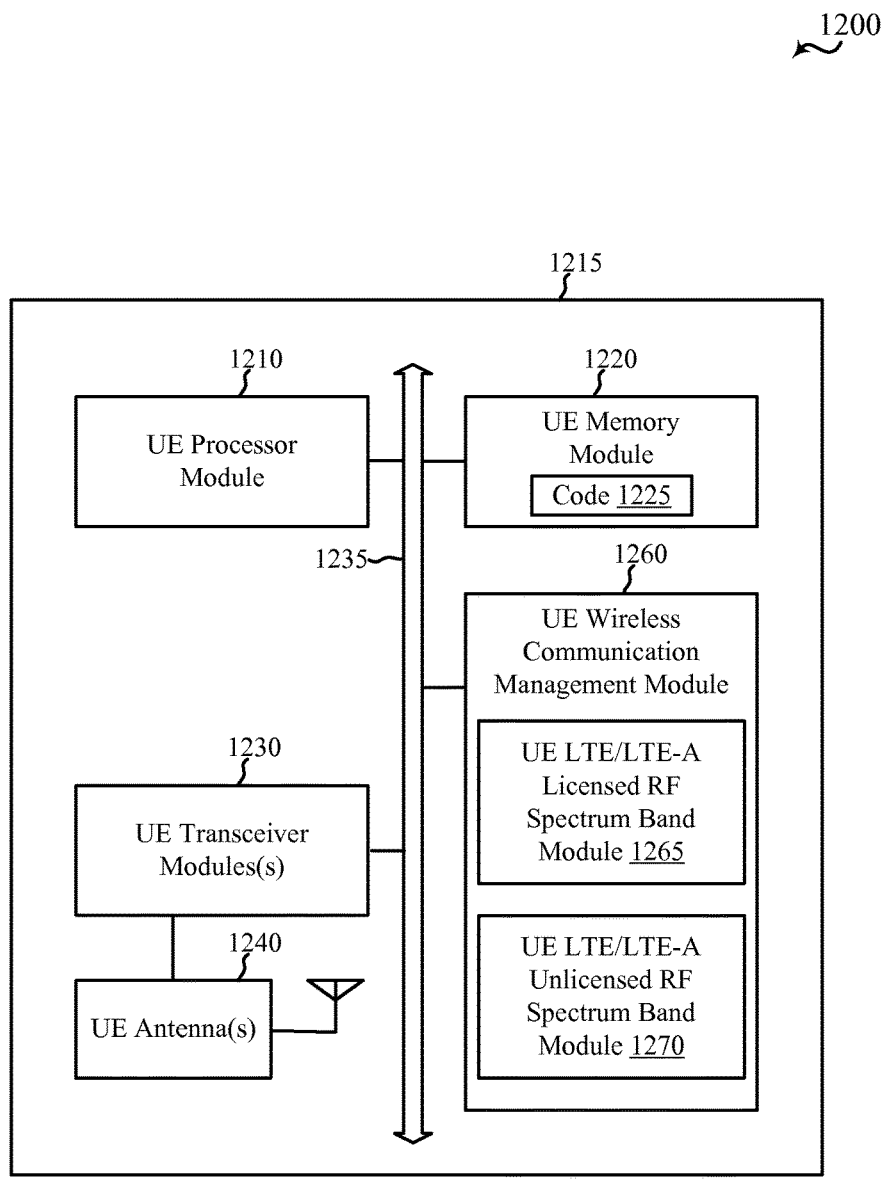
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1215 may, in some examples, have an internal power supply (not shown), such as a small battery, to facilitate mobile operation. In some examples, the UE 1215 may be an example of one or more aspects of the UE 115, 215, 215-*a*, 215-*b*, and/or 215-*c* described with reference to FIG. 1 and/or 2, and/or one or more aspects of the apparatus 805, 905, and/or 1005 described with reference to FIG. 8, 9, and/or 10. The UE 1215 may be configured to implement at least some of the UE and/or apparatus features and functions described with reference to FIGS. 1-10.

The UE 1215 may include a UE processor module 1210, a UE memory module 1220, at least one UE transceiver module (represented by UE transceiver module(s) 1230), at least one UE antenna (represented by UE antenna(s) 1240), and/or a UE wireless communication management module 1260. Each of these components may be in communication with each other, directly or indirectly, over one or more buses 1235.

The UE memory module 1220 may include RAM and/or ROM. The UE memory module 1220 may store computer-readable, computer-executable code 1225 containing instructions that are configured to, when executed, cause the UE processor module 1210 to perform various functions described herein related to wireless communication. Alternatively, the code 1225 may not be directly executable by the UE processor module 1210 but be configured to cause the UE 1215 (e.g., when compiled and executed) to perform various functions described herein.

The UE processor module 1210 may include an intelligent hardware device, e.g., a CPU, a microcontroller, an ASIC, etc. The UE processor module 1210 may process information received through the UE transceiver module(s) 1230 and/or information to be sent to the UE transceiver module(s) 1230 for transmission through the UE antenna(s) 1240. The UE processor module 1210 may handle, alone or in connection with the UE wireless communication management module 1260, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a shared radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis).

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may support communications in the licensed radio frequency spectrum band and/or the unlicensed radio frequency spectrum band. The UE transceiver module(s) 1230 may be configured to communicate bi-directionally, via the UE antenna(s) 1240, with one or more of the base stations 105, 205, and/or 205-*a* described with reference to FIG. 1 and/or 2, and/or one or more of the apparatus 805, 905, and/or 1005 described with reference to FIG. 8, 9, and/or 10. While the UE 1215 may include a single UE antenna, there may be examples in which the UE 1215 may include multiple UE antennas 1240.

The UE wireless communication management module 1260 may be configured to perform and/or control some or all of the features and/or functions described with reference to FIGS. 1-10 related to wireless communication (e.g., functions relating to determining a frame structure for communicating over an unlicensed radio frequency spectrum band, etc.). For example, the UE wireless communication management module 1260 may be configured to support a supplemental downlink mode, carrier aggregation mode, and/or standalone mode using the licensed radio frequency spectrum band and/or the unlicensed radio frequency spectrum band. The UE wireless communication management module 1260 may include a UE LTE/LTE-A licensed RF spectrum band module 1265 configured to handle LTE/LTE-A communications in the licensed radio frequency spectrum band, and a UE LTE/LTE-A unlicensed RF spectrum band module 1270 configured to handle LTE/LTE-A communications in the unlicensed radio frequency spectrum. The UE wireless communication management module 1260, or portions of it, may include a processor, and/or some or all of the functions of the UE wireless communication management module 1260 may be performed by the UE processor module 1210 and/or in connection with the UE processor module 1210. In some examples, the UE wireless communication management module 1260 may be an example of the wireless communication management module 820, 920, and/or 1020 described with reference to FIG. 8, 9, and/or 10.

Figure 13:
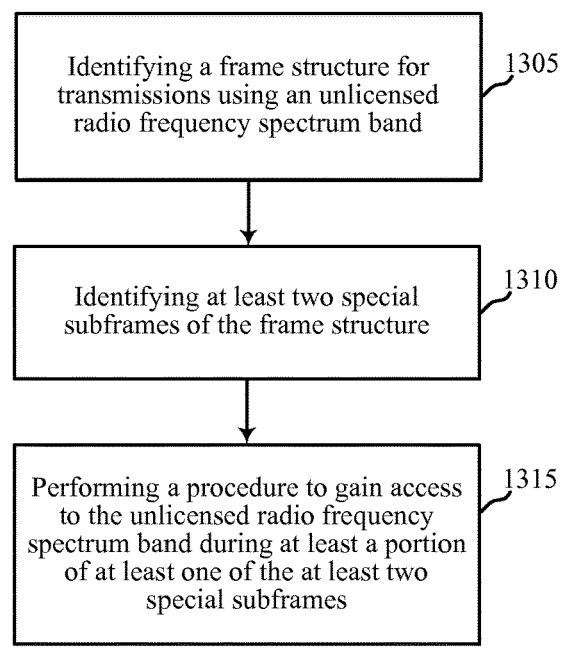
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105 and 205 and/or UEs 115 and 215 described with reference to FIG. 1 and/or 2, and/or aspects of one or more of the apparatuses 805, 905, and/or 1005 described with reference to FIG. 8, 9, and/or 10. In some examples, a base station, UE, and/or apparatus may execute one or more sets of codes to control the functional elements of the base station, UE, and/or apparatus to perform the functions described below.

At block 1305, the method 1300 may include identifying a frame structure for transmissions using an unlicensed radio frequency spectrum band. In some examples, the frame structure may include a TDD frame structure. The operation(s) at block 1305 may be performed using the wireless communication management module 820, 920, and/or 1020 described with reference to FIG. 8, 9, and/or 10, and/or the frame structure module 840, 940, and/or 1040 described with reference to FIG. 8, 9, and/or 10.

At block 1310, the method 1300 may include identifying at least two special subframes of the frame structure. In some examples, at least one of the at least two special subframes may include a silent period. The operation(s) at block 1310 may be performed using the wireless communication management module 820, 920, and/or 1020 described with reference to FIG. 8, 9, and/or 10, and/or the frame structure module 840, 940, and/or 1040 described with reference to FIG. 8, 9, and/or 10, and/or the special subframe module 950 and/or 1050 described with reference to FIG. 9 and/or 10.

At block 1315, the method 1300 may include performing a procedure to gain access to the unlicensed radio frequency spectrum band during at least a portion of at least one of the at least two special subframes. In some examples, the procedure to gain access to the unlicensed radio frequency spectrum band may include a listen before talk procedure. In some examples, performing the listen before talk procedure may include performing an eCCA procedure. In some examples, the at least two special subframes may include an uplink special subframe and a downlink special subframe. In some examples, at least a portion of the uplink special subframe may include the eCCA procedure and at least a portion of the downlink special subframe may include the eCCA procedure. In some examples, at least a portion of the uplink special subframe may include a silent period and at least a portion of the downlink special subframe may include the eCCA procedure.

The operation(s) at block 1315 may be performed using the wireless communication management module 820, 920, and/or 1020 described with reference to FIG. 8, 9, and/or 10, and/or the access procedure module 845, 945, and/or 1045 described with reference to FIG. 8, 9, and/or 10. Thus, the method 1300 may provide for wireless communication. It should be noted that the method 1300 is just one implementation and that the operations of the method 1300 may be rearranged or otherwise modified such that other implementations are possible.

Figure 14:
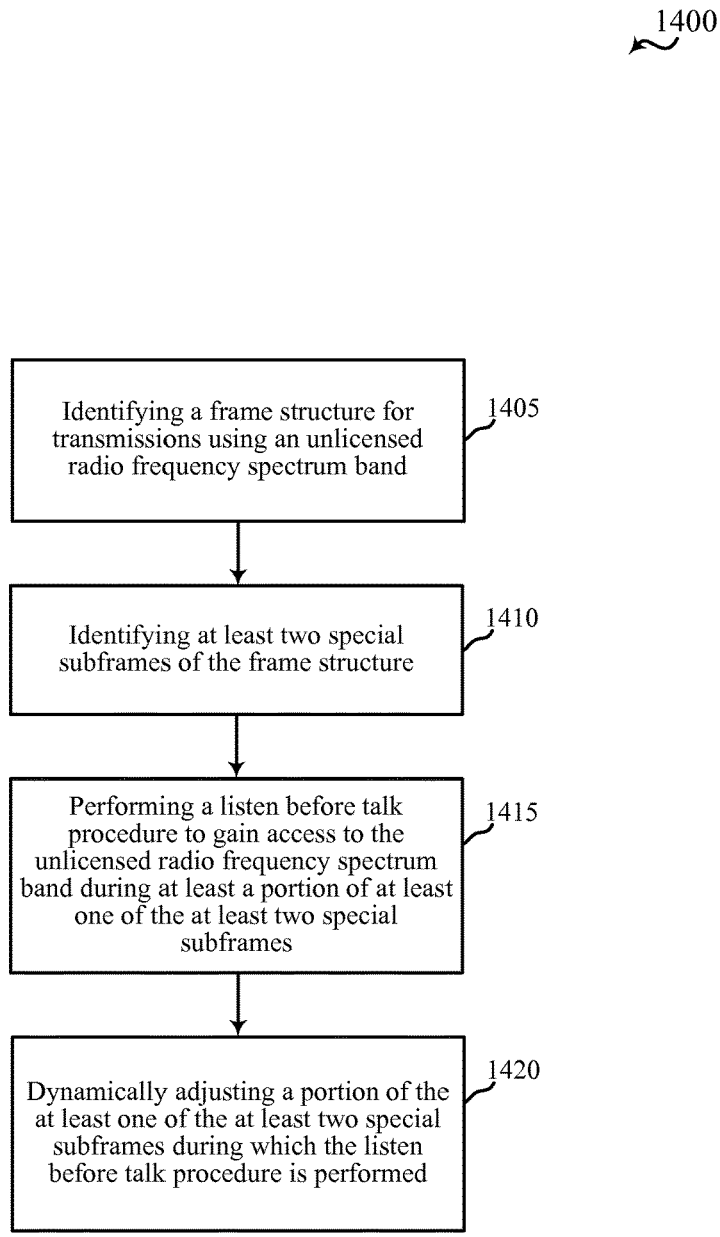
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105 and 205 and/or UEs 115 and 215 described with reference to FIG. 1 and/or 2, and/or aspects of one or more of the apparatuses 805, 905, and/or 1005 described with reference to FIG. 8, 9, and/or 10. In some examples, a base station, UE, and/or apparatus may execute one or more sets of codes to control the functional elements of the base station, UE, and/or apparatus to perform the functions described below.

At block 1405, the method 1400 may include identifying a frame structure for transmissions using an unlicensed radio frequency spectrum band. In some examples, the frame structure may include a TDD frame structure. The operation(s) at block 1405 may be performed using the wireless communication management module 820, 920, and/or 1020 described with reference to FIG. 8, 9, and/or 10, and/or the frame structure module 840, 940, and/or 1040 described with reference to FIG. 8, 9, and/or 10.

At block 1410, the method 1300 may include identifying at least two special subframes of the frame structure. In some examples, at least one of the at least two special subframes may include a silent period. The operation(s) at block 1410 may be performed using the wireless communication management module 820, 920, and/or 1020 described with reference to FIG. 8, 9, and/or 10, and/or the frame structure module 840, 940, and/or 1040 described with reference to FIG. 8, 9, and/or 10, and/or the special subframe module 950 and/or 1050 described with reference to FIG. 9 and/or 10.

At block 1415, the method 1400 may include performing a procedure to gain access to the unlicensed radio frequency spectrum band during at least a portion of at least one of the at least two special subframes. In some examples, the procedure to gain access to the unlicensed radio frequency spectrum band may include a listen before talk procedure. In some examples, performing the listen before talk procedure may include performing an eCCA procedure. In some examples, the at least two special subframes may include an uplink special subframe and a downlink special subframe. In some examples, at least a portion of the uplink special subframe may include the eCCA procedure and at least a portion of the downlink special subframe may include the eCCA procedure. In some examples, at least a portion of the uplink special subframe may include a silent period and at least a portion of the downlink special subframe may include the eCCA procedure. The operation(s) at block 1415 may be performed using the wireless communication management module 820, 920, and/or 1020 described with reference to FIG. 8, 9, and/or 10, and/or the access procedure module 845, 945, and/or 1045 described with reference to FIG. 8, 9, and/or 10, and/or the listen before talk module 955 and/or 1055 described with reference to FIG. 9 and/or 10.

At block 1420, the method 1400 may include dynamically adjusting a portion of the at least one of the at least two special subframes during which the listen before talk procedure is performed. In some examples, dynamically adjusting the portion of the at least one of the at least two special subframes may include identifying a first value associated with a channel occupancy time and identifying a second value based at least in part on the first value. The second value may be a counter to indicate a number of eCCA procedures to perform. In some examples, at least one of the at least two special subframes comprises a silent period, the duration of the silent period being based at least in part on the second value. The operation(s) at block 1420 may be performed using the wireless communication management module 820, 920, and/or 1020 described with reference to FIG. 8, 9, and/or 10, and/or the frame structure module 840, 940, and/or 1040 described with reference to FIG. 8, 9, and/or 10, and/or the special subframe module 950 and/or 1050 described with reference to FIG. 9 and/or 10.

In some examples, the method 1400 may further include determining a successful CCA procedure, decrementing the second value upon the determination of a successful CCA procedure, and determining whether the second value equals zero. In some examples, the method 1400 may further include continuing the listen before talk procedure beyond the portion of the at least one of the at least two special subframes if the second value is not equal to zero at the end of the at least one special subframe. In some examples, upon determining that the second value equals zero, the method may further include transmitting an information signal. In some examples, upon determining that the second value equals zero, the method 1400 may further include performing a simple CCA procedure and transmitting an information signal during the at least one of the at least two special subframes. In some examples, the information signal may include a channel usage beacon signal. In some examples, the information signal may include at least one symbol of a channel usage beacon signal.

In some examples, the method 1400 may further include dynamically adjusting a boundary of the portion of the at least one of the at least two special subframes to transmit the information signal. The adjustment of the boundary may be based at least in part on the identified second value. In some examples, identifying the first value associated with the channel occupancy time may include accessing a database comprising a plurality of first values and selecting one of the plurality of first values from the database. In some examples, identifying the first value associated with the channel occupancy time may include receiving the first value via a unicast or a broadcast transmission. In some examples, the method 1400 may further include transmitting the identified first value via a unicast or a broadcast transmission. In some examples, the first value may be identified based at least in part on an uplink/downlink (UL/DL) configuration. In some examples, the first value may be identified based at least in part on a load of a channel of the unlicensed radio frequency spectrum band. In some examples, the first value may be identified based at least in part on a channel access success statistic.

In some examples, the method 1400 may further include synchronizing the listen before talk procedure with a base station based at least in part on the second value. In some examples, the second value is identified based at least in part on a downlink channel occupancy time. In some examples, the method 1400 may further include synchronizing the listen before talk procedure with a UE based at least in part on the second value. In some examples, the second value is identified based at least in part on an uplink channel occupancy time.

The operation(s) at block 1420 may be performed using the wireless communication management module 820, 920, and/or 1020 described with reference to FIG. 8, 9, and/or 10. Thus, the method 1400 may provide for wireless communication. It should be noted that the method 1400 is just one implementation and that the operations of the method 1400 may be rearranged or otherwise modified such that other implementations are possible.

The detailed description set forth above in connection with the appended drawings describes exemplary embodiments and does not represent the only embodiments that may be implemented or that are within the scope of the claims. The term "example" or "exemplary," when used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), computer disk ROM (CD-ROM), or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
identifying, by a processor, a frame structure for transmissions using an unlicensed radio frequency spectrum band, the frame structure comprising at least two special subframes that include an access procedure portion, the access procedure portion having an adjustable duration, wherein the at least two special subframes comprise an uplink special subframe and a downlink special subframe;
performing, by the processor, a listen before talk procedure, wherein performing the listen before talk procedure comprises performing an enhanced clear channel assessment (eCCA) procedure in at least a portion of the uplink special subframe and a portion of the downlink special subframe, where the listen before talk procedure is part of the access procedure portion;
identifying a first value associated with a channel occupancy time;
identifying a second value based at least in part on the first value, the second value being a counter that decrements when a successful eCCA procedure is performed; and
dynamically adjusting the adjustable duration based at least in part on the first value and the second value.

2. The method of claim 1, wherein the frame structure comprises a time division duplex (TDD) frame structure.

3. The method of claim 1, further comprising:
dynamically adjusting the access procedure portion of the at least one of the at least two special subframes during which the eCCA procedure is performed.

4. The method of claim 1, wherein the first value is an integer number between 4 and 32.

5. The method of claim 1, wherein at least one of the at least two special subframes comprises a silent period, a duration of the silent period being based at least in part on the second value.

6. The method of claim 1, further comprising:
determining whether the second value equals zero.

7. The method of claim 6, further comprising:
continuing the listen before talk procedure beyond the access procedure portion of the at least one of the at least two special subframes if the second value is not equal to zero at the end of the at least one of the at least two special subframes.

8. The method of claim 6, further comprising:
upon determining that the second value equals zero, transmitting an information signal.

9. The method of claim 8, wherein the information signal comprises a channel usage beacon signal.

10. The method of claim 8, further comprising:
dynamically adjusting a boundary of the access procedure portion of the at least one of the at least two special subframes to transmit the information signal, the adjustment of the boundary being based at least in part on the identified second value.

11. The method of claim 1, wherein the first value is identified based at least in part on an uplink/downlink (UL/DL) configuration.

12. The method of claim 1, wherein the first value is identified based at least in part on a load of a channel of the unlicensed radio frequency spectrum band.

13. The method of claim 1, wherein the first value is identified based at least in part on channel access success statistics.

14. The method of claim 1, wherein identifying the first value associated with the channel occupancy time comprises receiving the first value via a unicast or a broadcast transmission.

15. The method of claim 1, further comprising:
transmitting the identified first value via a unicast or a broadcast transmission.

16. The method of claim 1, further comprising:
synchronizing the listen before talk procedure with a base station based at least in part on the second value.

17. The method of claim 1, wherein the second value is identified based at least in part on a downlink channel occupancy time.

18. The method of claim 1, further comprising:
synchronizing the listen before talk procedure with a user equipment (UE) based at least in part on the second value.

19. An apparatus for wireless communication, comprising:
a processor;
memory in electronic communication with the processor; and
instructions stored in the memory, the instructions being executable by the processor to:
identify, by the processor, a frame structure for transmissions using an unlicensed radio frequency spectrum band, the frame structure comprising at least two special subframes that include an access procedure portion, the access procedure portion having an adjustable duration, wherein the at least two special subframes comprise an uplink special subframe and a downlink special subframe;
perform, by the processor, a listen before talk procedure, wherein performing the listen before talk procedure comprises performing an enhanced clear channel assessment (eCCA) procedure in at least a portion of the uplink special subframe and a portion of the downlink special subframe, where the listen before talk procedure is part of the access procedure portion;
identify a first value associated with a channel occupancy time;
identify a second value based at least in part on the first value, the second value being a counter that decrements when a successful eCCA procedure is performed; and
dynamically adjust the adjustable duration based at least in part on the first value and the second value.

20. An apparatus for wireless communication, comprising:
means for identifying, by a processor, a frame structure for transmissions using an unlicensed radio frequency spectrum band, the frame structure comprising at least two special subframes that include an access procedure portion, the access procedure portion having an adjustable duration, wherein the at least two special subframes comprise an uplink special subframe and a downlink special subframe;
means for performing, by the processor, a listen before talk procedure, wherein performing the listen before talk procedure comprises performing an enhanced clear channel assessment (eCCA) procedure in at least a portion of the uplink special subframe and a portion of the downlink special subframe, where the listen before talk procedure is part of the access procedure portion;
means for identifying a first value associated with a channel occupancy time;
means for identifying a second value based at least in part on the first value, the second value being a counter that decrements when a successful eCCA procedure is performed; and
means for dynamically adjusting the adjustable duration based at least in part on the first value and the second value.

21. A non-transitory computer-readable medium storing instructions executable by a processor to cause a wireless communication apparatus to:
identify, by a processor, a frame structure for transmissions using an unlicensed radio frequency spectrum band, the frame structure comprising at least two special subframes that include an access procedure portion, the access procedure portion having an adjustable duration, wherein the at least two special subframes comprise an uplink special subframe and a downlink special subframe;
perform, by the processor, a listen before talk procedure, wherein performing the listen before talk procedure comprises performing an enhanced clear channel assessment (eCCA) procedure in at least a portion of the uplink special subframe and a portion of the downlink special subframe, where the listen before talk procedure is part of the access procedure portion;
identify a first value associated with a channel occupancy time;
identify a second value based at least in part on the first value, the second value being a counter that decrements when a successful eCCA procedure is performed; and
dynamically adjust the adjustable duration based at least in part on the first value and the second value.

* * * * *